US010826554B2

(12) United States Patent
Lee

(10) Patent No.: US 10,826,554 B2
(45) Date of Patent: Nov. 3, 2020

(54) MOBILE PHONE CASE HAVING HIDDEN CAMERA DETECTING FUNCTION

(71) Applicant: Hyunah Lee, Seoul (KR)

(72) Inventor: Hyunah Lee, Seoul (KR)

(*) Notice: Subject to any disclaimer, the term of this patent is extended or adjusted under 35 U.S.C. 154(b) by 0 days.

(21) Appl. No.: 16/666,093

(22) Filed: Oct. 28, 2019

(65) Prior Publication Data

US 2020/0169281 A1    May 28, 2020

(30) Foreign Application Priority Data

Nov. 26, 2018  (KR) .................. 10-2018-0146967

(51) Int. Cl.
*H04N 5/222*   (2006.01)
*H04N 5/225*   (2006.01)
*H04B 1/3888*  (2015.01)
*H04M 1/21*    (2006.01)
*H04B 1/3827*  (2015.01)

(52) U.S. Cl.
CPC ......... *H04B 1/3888* (2013.01); *H04B 1/3833* (2013.01); *H04M 1/21* (2013.01)

(58) Field of Classification Search
None
See application file for complete search history.

(56) References Cited

U.S. PATENT DOCUMENTS

| 7,581,893 B2* | 9/2009 | Miramontes | G03B 17/00 396/448 |
| 7,950,859 B2* | 5/2011 | Zhang | G03B 11/043 396/448 |
| 8,023,040 B2* | 9/2011 | Zhou | H04M 1/0264 348/376 |
| 8,764,319 B2* | 7/2014 | Oh | G03B 11/041 396/448 |

(Continued)

FOREIGN PATENT DOCUMENTS

| JP | 2004023723 | 6/2002 |
| KR | 20010088494 | 9/2001 |

(Continued)

OTHER PUBLICATIONS

Written Decision on Registration for Korean Application No. 10-2018-0146967, dated Mar. 27, 2019, 1 page.

(Continued)

*Primary Examiner* — Tuan A Tran

(74) *Attorney, Agent, or Firm* — Dinsmore & Shohl LLP; Wisu Sul

(57) ABSTRACT

Provided is a mobile phone case having a hidden camera detection function. The mobile phone case includes a case body whose one surface is formed to enclose portions, except for a display of a mobile phone and having an opening formed at a position corresponding to a light emitting diode (LED) light source and a camera of the mobile phone; a detector including a red filter for passing through light of a red wavelength of a wavelength range of (Continued)

600 nm to 700 nm; and an operation unit whose one end is coupled to the detector and whose the other end is protruded to the other surface of the case body and for enabling the detector to move in a vertical or horizontal direction, wherein the detector covers or opens the opening by the operating unit.

24 Claims, 28 Drawing Sheets
(7 of 28 Drawing Sheet(s) Filed in Color)

(56) References Cited

U.S. PATENT DOCUMENTS

| | | | | |
|---|---|---|---|---|
| 9,069,083 | B2* | 6/2015 | Goldstein | G01T 7/00 |
| 9,124,792 | B2* | 9/2015 | Barangan | H04N 5/2254 |
| 9,369,170 | B2* | 6/2016 | Sorrentino | H04M 1/185 |
| 9,578,147 | B2* | 2/2017 | Peng | H04M 1/0264 |
| 9,596,393 | B2* | 3/2017 | Barros | H04N 5/2252 |
| 9,641,208 | B2* | 5/2017 | Sela | H04B 1/3888 |
| 10,237,380 | B1* | 3/2019 | Nguyen | H04M 1/0264 |
| 10,404,841 | B1* | 9/2019 | Fan | G06F 1/1686 |
| 2010/0079661 | A1* | 4/2010 | Lin | H04N 5/2256 |
| | | | | 348/371 |
| 2010/0166414 | A1* | 7/2010 | Zhang | G03B 11/043 |
| | | | | 396/448 |
| 2010/0247091 | A1* | 9/2010 | Olsson | H01H 3/20 |
| | | | | 396/448 |
| 2013/0316690 | A1* | 11/2013 | Wildner | H04W 8/22 |
| | | | | 455/418 |
| 2015/0163385 | A1* | 6/2015 | Haddad | H04N 5/2254 |
| | | | | 348/374 |
| 2018/0123631 | A1* | 5/2018 | Hessabi | H04B 1/3888 |

FOREIGN PATENT DOCUMENTS

| | | |
|---|---|---|
| KR | 200348118 | 4/2004 |
| KR | 1020060040799 | 11/2004 |
| KR | 100726420 | 6/2007 |
| KR | 2020120000688 | 2/2012 |
| KR | 101377643 | 3/2014 |
| KR | 1020140132239 | 11/2014 |
| KR | 1020160052060 | 5/2016 |
| KR | 101918855 | 11/2018 |

OTHER PUBLICATIONS

Notification of Reason for Refusal for Korean Application No. 10-2018-0146967, dated Jan. 10, 2019, 6 pages.

Joongang-Ilbo, Online Article [online], Sep. 12, 2018, [Jan. 8, 2019 search] internet: < URL: https: / / news joins. com. / article / 22963035, It easily can find the bathroom hidden camera if it has the cellophane paper, 5 pages.

* cited by examiner

MOBILE PHONE CASE HAVING HIDDEN CAMERA DETECTING FUNCTION

CROSS-REFERENCE TO RELATED APPLICATION

This application claims the benefit of Korean Patent Application No. 10-2018-0146967, filed on Nov. 26, 2018, in the Korean Intellectual Property Office, the disclosure of which is incorporated herein in its entirety by reference.

BACKGROUND OF THE INVENTION

Field of the Invention

The present disclosure relates to a mobile phone case that can detect a hidden camera.

Related Art

Recently, as a performance of electronic devices such as mobile devices and cameras gradually develops, electronic device products having a very improved performance while having a gradually small size are being released. According to demands of consumers, electronic devices having the same performance as that of conventional electronic devices or having a better performance than that of the conventional electronic devices while having a gradually small size are being released. Among them, while a performance of cameras is improved, the cameras have a small size, and it is a trend that the cameras have been microminiaturized beyond miniaturization. However, these cameras are used in such a way as to secretly photograph other people's privacy or body beyond an original purpose, and use of a kind of hidden camera is increasing, which becomes a social problem.

Therefore, recently, a device that may detect a hidden camera has been developed, and such a hidden camera detection device has a very large volume, is an expensive equipment, or uses a method of purchasing and installing a separate device and thus consumers have a burden in purchasing, or have inconvenience in separately carrying, or have a large volume, which is inconvenient to use as a portable device.

Therefore, there is a need for a research on a product that enables a user to detect a hidden camera while conveniently carrying and using.

SUMMARY OF THE INVENTION

The present disclosure provides a mobile phone case that can easily carry and detect a hidden camera at a low cost.

The present disclosure further provides a mobile phone case that can easily carry and use and have excellent durability by minimizing damage.

The objects of the present disclosure are not limited to the above-described objects and the other objects will be understood by those skilled in the art from the following description.

In an aspect, a method mobile phone case includes a case body whose one surface is formed to enclose portions, except for a display of a mobile phone and having an opening formed at a position corresponding to a light emitting diode (LED) light source and a camera of the mobile phone; a detector including a red filter for passing through light of a red wavelength of a wavelength range of 600 nm to 700 nm; and an operation unit whose one end is coupled to the detector and whose the other end is protruded to the other surface of the case body and for enabling the detector to move in a vertical or horizontal direction, wherein the detector covers or opens the opening by the operating unit.

The detector may further include a support coupled to one surface of the red filter and having a thickness of a range of 0.5 mm to 0.8 mm and made of a transparent material.

The red filter may transmit more light of a red wavelength of a wavelength range of 600 nm to 700 nm among light emitted from the LED light source of the mobile phone.

The case body may comprise one surface for covering a rear surface of the mobile phone display; an edge portion extended from the one surface and enclosing a periphery of the mobile phone display to be coupled to the mobile phone; an opening formed at a position corresponding to an LED light source and a camera of the mobile phone at the one surface and for covering both end surfaces of the LED light source and the camera; and a guide line opened to vertically or laterally move while a portion of the operation unit is protruded to the outside, and the detector may move in a vertical direction or a lateral direction to cover or not to cover the opening, when a part of the operation unit moves in a vertical direction or a lateral direction of the guide line.

The case body may comprise a first receiving portion formed at one surface to which the mobile phone is coupled and for receiving at least a portion of the detector, and at least a portion of the detector may be received with interposed between the first receiving portion and one surface of the case body.

The first receiving portion may further comprise a first damage prevention portion opened in a horizontal plane direction in which one surface of the case body is formed at positions of both ends of a direction opposite to a direction in which the opening is formed.

The first damage prevention portion may be opened in a direction perpendicular to a horizontal plane direction in which one surface of the case body is formed.

The first receiving portion may further comprise a first support line extended from one end to the other end of an opening in which the first damage prevention portion is formed and contacting one surface of the case body, the first support line may have a height lower than that of the first receiving portion in which the first damage preventing portion is not formed, and the detector may be positioned above the first support line, when the detector is received in the first receiving portion.

The mobile phone case may further comprise at least one first buffering portion protruded from one surface of the case body and formed with an elastic member, the first buffering portion may contact at least a portion of the detector when the detector is received in the first receiving portion.

The case body may comprise a second receiving portion formed at one surface to which the mobile phone is coupled and for receiving at least a portion of the detector, at least a portion of the detector may be received with interposed between the second receiving portion and one surface of the case body, and at least a portion of the detector may be received in the second receiving portion when the opening is covered.

The second receiving portion may further comprise a second damage prevention portion opened in a horizontal direction in which one surface of the case body is formed at a position of both ends of a direction opposite to a direction in which the opening is formed.

The second damage prevention portion may be opened in a direction perpendicular to a horizontal surface direction in which one surface of the case body is formed.

The second receiving portion may further comprise a second support line extended from one end to the other end of an opening in which the second damage prevention portion is formed and contacting one surface of the case body, the second support line may have a height lower than that of the second receiving portion in which the second damage prevention portion is not formed, and the detector may be positioned above the second supporting line, when the detector is received in the second receiving portion.

The mobile phone case may further comprise a second engraving portion recessed inward at one surface of the case body, the second engraving portion may be overlapped with at least a portion of the detector on a vertical line, when the detector is received in the second receiving portion.

The mobile phone case may further comprise at least one second buffering portion protruded from one surface of the case body and formed with an elastic member, the second buffering portion may contact at least a portion of the detector, when the detector is received in the second receiving portion.

The mobile phone case may further comprise a stopper protruded from one surface of the case body, the stopper may stop a movement of the detector by contact with the cover, when the detector is received in the first receiving portion.

The mobile phone case may comprise a cover coupled to a part of the operation unit and a part of the detector, the first receiving portion may comprise a penetration portion that is opened to enable the cover to pass therethrough, and the cover may cover all of the guide lines, when the detector covers the opening.

The detector may further comprise a fastening portion for fastening the red filter and the support at both ends facing each other.

The detector may further comprise an anti-reflection portion recessed inward at a position adjacent to the mobile phone, and the anti-reflection portion may be formed at a position corresponding to that of the LED light source of the mobile phone.

The anti-reflection portion may cover all horizontal cross-sections of the LED light source on a vertical line.

The anti-reflection portion may do not overlap a horizontal cross-section on a vertical line with the camera of the mobile phone.

The anti-reflection portion may further comprise a light absorber made of a material absorbing light in the recessed inner wall.

The detailed matters of the embodiments will be included in the detailed description and the drawings.

BRIEF DESCRIPTION OF THE DRAWINGS

The patent or application file contains at least one drawing executed in color. Copies of this patent or patent application publication with color drawing(s) will be provided by the Office upon request and payment of necessary fee.

The above and other advantages of the present disclosure will become readily apparent by reference to the following detailed description when considered in conjunction with the accompanying drawings wherein.

DESCRIPTION OF EXEMPLARY EMBODIMENTS

Figure 1:
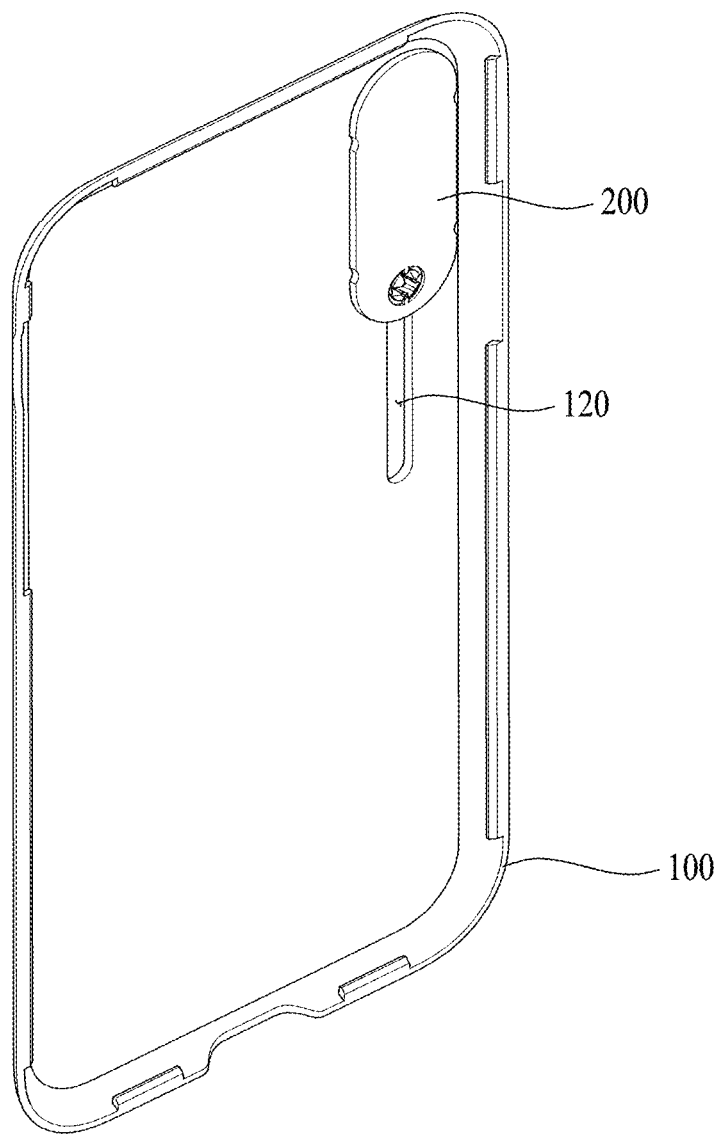
FIG. 1 is a schematic front perspective view illustrating a raised detector of a mobile phone case according to an embodiment of the present disclosure.

The advantages and features of the present disclosure and a method of achieving them will become apparent with reference to the embodiments described in detail below together with the accompanying drawings. However, it should be understood that the present disclosure is not limited to the embodiments described below, but may be implemented in various other forms and the embodiments are provided so that the disclosure of the present disclosure is fully complete and are provided to fully notify the scope of the present disclosure to those skilled in the art, and the present disclosure is defined by the scope of the claims. Like reference numerals designate like elements throughout the specification. In the drawings, the sizes and relative sizes of layers and regions may be exaggerated for clarity of a description.

Spatially relative terms "below", "beneath", "lower", "lower surface", "lower side", "above", "upper", "upper surface", and "upper side" may be used for easily describing a correlation of one device or components with another device or components.

Although the first, second, etc., are used for describing various components, these components are not limited by these terms. These terms are used for only distinguishing one component from another component. Therefore, a first component described below may be a second component within the scope of the present disclosure.

For convenience of description, the drawings illustrated for description of various embodiments of the present disclosure may be exaggerated in terms of each component, and a relative size, height, and length ratio between components.

Hereinafter, embodiments of the present disclosure will be described in detail with reference to the attached drawings.

Figure 2:
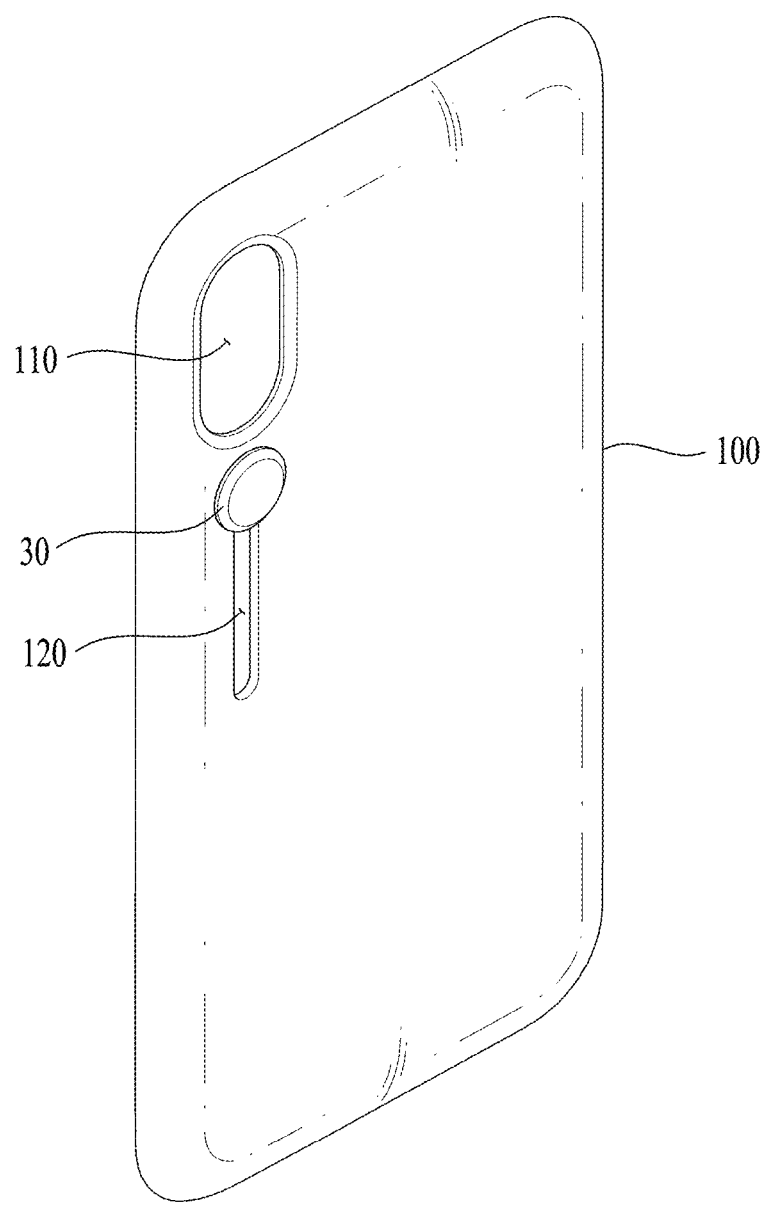
FIG. 2 is a schematic rear perspective view illustrating a raised detector of a mobile phone case according to an embodiment of the present disclosure.
Figure 3:
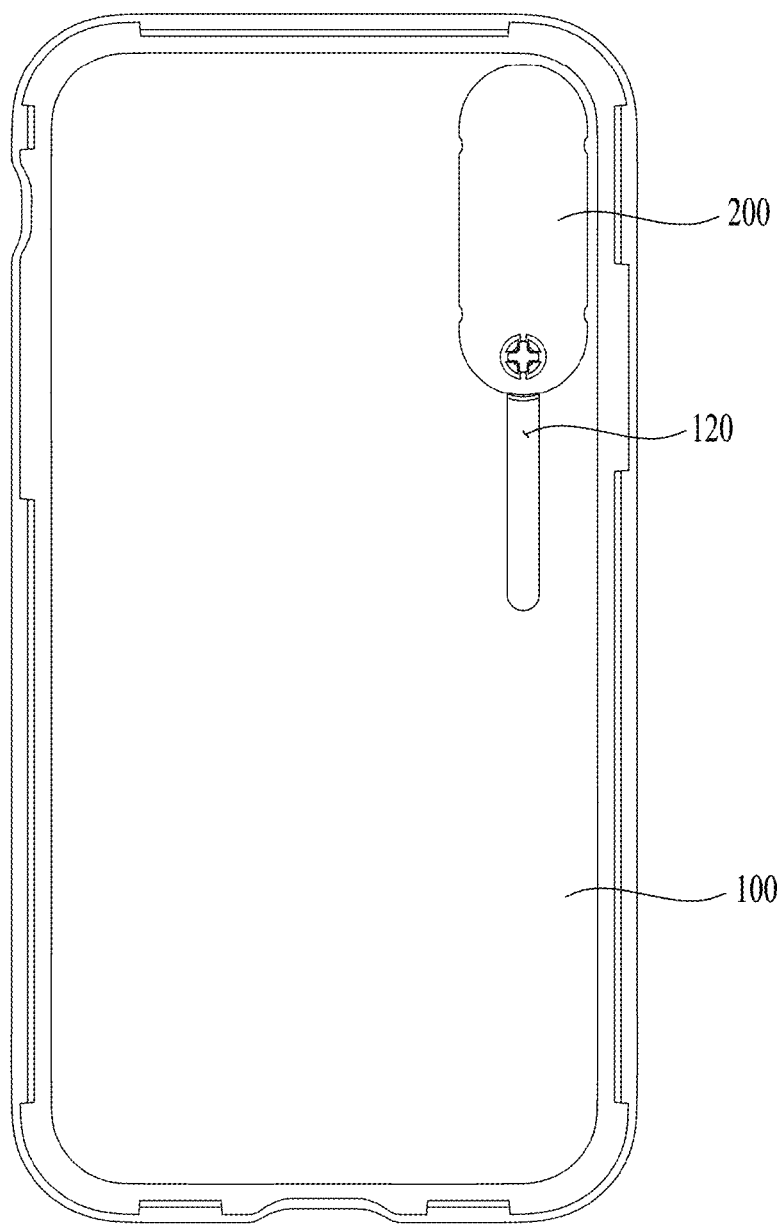
FIG. 3 is a front view illustrating a raised detector of a mobile phone case according to an embodiment of the present disclosure.
Figure 4:
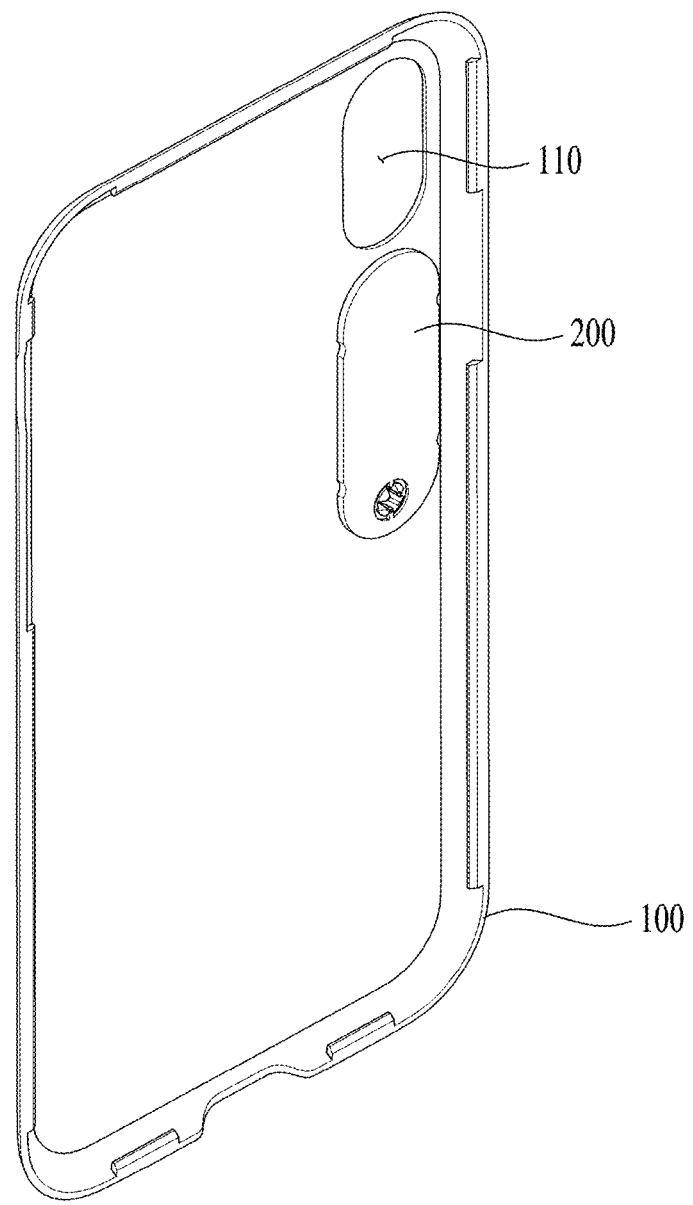
FIG. 4 is a front perspective view illustrating a lowered detector of a mobile phone case according to an embodiment of the present disclosure.
Figure 5:
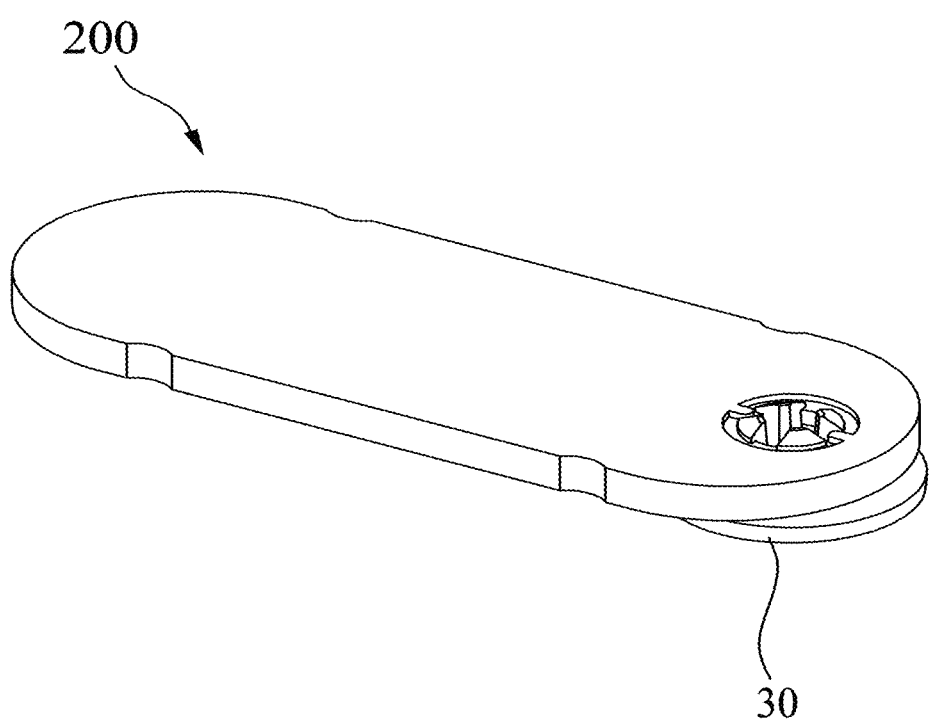
FIG. 5 is a perspective view illustrating in detail a detector according to an embodiment of the mobile phone case of FIG. 1.

FIG. 1 is a front perspective view illustrating a mobile phone case according to an embodiment of the present disclosure, FIG. 2 is a rear perspective view illustrating the mobile phone case of FIG. 1, and FIG. 3 is a front view illustrating the mobile phone case of FIGS. 1 and 2. FIGS. 1 to 3 are diagrams when all of detectors to be described later are raised to cover an opening. FIG. 4 is a front perspective view when the detector of the mobile phone case of FIG. 1 is lowered. Further, FIG. 5 is a perspective view illustrating in more detail the detector according to an embodiment of the mobile phone case of FIG. 1.

Hereinafter, a mobile phone case having a hidden camera detection function according to an embodiment of the present disclosure will be described with reference to FIGS. 1 to 5.

Referring to FIGS. 1 to 5, the mobile phone case having a hidden camera detection function according to an embodiment of the present disclosure includes a case body 100 formed to enclose portions, except for a display of a mobile phone and the mobile phone and having an opening 110 formed at a position corresponding to a light emitting diode (LED) light source and a camera of the mobile phone, a detector 200 including a red filter 10 for passing through light having a red wavelength in a wavelength range of 600 nm to 700 nm, and an operation unit 30 whose one end is coupled to the detector 200 and whose the other end is coupled to one surface of the case body 100 and for enabling the detector 200 to move in a vertical or horizontal direction. Further, it is characterized in that the detector 200 covers or opens the opening 110 by the operation unit 30.

The case body 100 may be configured in a form for protecting the mobile phone from damage. Further, recently, the opening 110 is formed so that external light is incident through a camera generally existing in the mobile phone to recognize an external object, and the opening 110 is formed so that light emitted from an LED light source may be emitted to the outside. In order to prevent the mobile phone from being damaged by an external impact, the case body 100 may be made of a synthetic resin material, for example, polyurethane or polycarbonate (PC), and a material of the case body 100 is well known in the art and a detailed description thereof will be omitted.

More specifically, the case body 100 includes one surface that covers a rear surface of a mobile phone display, an edge portion extended from one surface to enclose a peripheral portion of the mobile phone display and for enabling to being coupled to the mobile phone, an opening 110 formed at a position corresponding to the camera and the LED light source of the mobile phone at the one surface and for covering both end surfaces of the camera and the LED light source, and a guide line 120 in which a portion of the operation unit 30 is opened to move vertically or laterally while being protruded to the outside, and when a portion of the operation unit 30 moves in a vertical or horizontal direction of the guide line 120, the detector 200 moves in a vertical or horizontal direction and thus it is characterized in that the detector 200 covers or does not cover the opening 110. In order to improve durability, a separate cover coupled to the case body 100 may be provided between the case body 100 and other components coupled to the case body 100 and the user's mobile phone. In this case, in the cover, an edge portion is provided that encloses a periphery of the mobile phone display and for enabling to be coupled to the mobile phone, and other components may be provided in the case body coupled to the cover.

The edge portion may be extended from one surface of the case body 100 and be coupled to the mobile phone while covering a periphery of a display of a side surface and a part of a front surface in which an on/off operation button of the mobile phone is positioned. Further, one surface of the case body 100 may cover an opposite surface, i.e., a rear surface of the mobile phone display. That is, one surface of the case body 100 may be referred to as a surface facing a portion in which a mobile phone camera and an LED light source exist and in which there is no main display, and for convenience of description, a surface opposite to the one surface of the case body 100 may be referred to as the other surface.

An opening 110 is formed in the case body 100. The opening 110 is opened to penetrate both one surface and the other surface of the case body 100. A horizontal cross-section formed by the opening 110 may cover both end surfaces of the camera and the LED light source of the mobile phone on a vertical line. Thereby, while the mobile phone case is mounted in the mobile phone, when the opening 110 is not covered by the detector 200 of the present disclosure, both end surfaces of the camera and the LED light source of the mobile phone may be exposed to the outside and be visible from the outside. Because materials constituting the detector 200 are made of a transparent material or pass through light having a wavelength near the red, even when the detector 200 is raised to cover the LED light source and the camera, the detector 200 may be visible from the outside.

The LED light source of the mobile phone may be a kind of flash generally formed to be visible from the outside in a smart phone or the like. The LED light source may be visible from the outside together with the camera of the mobile phone, may be used as flash use to supplement light to operations such as taking a picture, or may be used for a flash function (function of illuminating a periphery) by separately driving only the LED light source. That is, the LED light source of the mobile phone described in the present disclosure may be defined as being visible from the outside and formed at a position adjacent to the camera. In the case of a mobile phone, in order to drive the display, the LED light source generally separately exists at the inside of the mobile phone, i.e., at a position that is not visible from the outside and thus it is understood that the LED light source described in the present disclosure is distinguished from an LED light source for driving the display inside the mobile phone and is visible from the outside and is formed at a position adjacent to a camera element visible from the outside.

The case body 100 includes a guide line 120, and the guide line 120 is opened to penetrate both one surface and the other surface of the case body 100, as in the opening 110. However, the guide line 120 is for vertically or laterally moving the operation unit 30 and may be extended in a specific moving direction (vertically or laterally) relative to the opening 110.

One end of the operation unit 30 is coupled to the detector 200, and the other end thereof is protruded to the other surface of the case body 100 and thus the user may operate the operation unit 30 at the outside. Further, the operation unit 30 may move in a vertical or lateral direction through the guide line 120 and thus when the user operates the operation unit 30 at the outside, the operation unit 30 may move in a vertical or lateral direction through a movement path of the guide line 120. In the above description, a vertical or lateral direction is defined, but this does not mean only a linear direction or a vertical or horizontal direction and may be changed in various directions as needed, such as a curved or diagonal direction.

The detector 200 connected to one end through a movement of the operation unit 30 may move between the mobile phone and one surface of the case body 100 and thus the detector 200 may or may not cover the camera and the LED light source of the mobile phone. That is, the LED light source and the camera may or may not be covered depending on a position. Therefore, by the red filter to be described in more detail below, when the user wants to use, by operating the operation unit 30 outside the case body 100 based on the user, the opening 110 is covered, thereby covering the camera and the LED light source of the mobile phone and thus a hidden camera around the user may be detected and when it is unnecessary that the user detects a hidden camera, the detector 200 is hidden inside between the case body and the mobile phone and thus even while using with an original use (taking a picture, flash function, etc.) of the camera or the LED light source of the mobile phone, the detector 200 may be prevented from being damaged.

The detector 200 may be connected to the operation unit 30 and thus when the user moves the operation unit 30, a horizontal cross-section of the detector 200 may cover the LED light source and the camera of the mobile phone. The red filter of the detector 200 may pass through light having a red wavelength in a wavelength range of 600 nm to 700 nm. For example, the red filter may pass through, for example, 50% to 60%, 60% to 70%, 70% to 80%, 80% to 90%, and 90% to 99% of light of a red wavelength in the wavelength range of 600 nm to 700 nm. In other words, the red filter may emit relatively more light of a red wavelength band of general light spectrum and block or absorb light of other wavelength bands. Further, the red filter may transmit relatively more light of a red wavelength in a wavelength range of 600 nm to 700 nm than light of other wavelength bands among light emitted from the LED light source of the mobile phone. The red filter may be, for example, a synthetic resin in which red dye is dispersed and included or red cellophane paper, but the present disclosure is not particularly limited thereto.

The red filter of the detector 200 mainly passes through light of a red wavelength, and when light of the red wavelength passed in this way is radiated to a hidden camera, a lens core of the hidden camera reflects the light of the red wavelength, and the camera of the mobile phone recognizes the light, thereby detecting the hidden camera. Therefore, as described above, when the user doubts about whether there is a hidden camera in a specific space, the user positions the detector 200 in a portion corresponding to each other on a vertical line with the camera and the LED light source of the mobile phone through the operating unit 30, and when the user operates both the camera and the LED light source, the detector 200 and the camera may recognize light reflected from the lens core of the hidden camera and thus the user may know this through the display of the mobile phone.

Therefore, in the case of a mobile phone case according to the present disclosure, a hidden camera may be detected using the red filter of the detector 200, the camera and the LED light source of the mobile phone only in a required case while using a mobile phone to correspond to normal use of the mobile phone in normal times only with possession of a mobile phone case without mounting of a separate bulky device or mounting or possession of a device requiring a separate light source. That is, even while using a basic function of a conventional mobile phone and a basic function of the mobile phone case protecting the mobile phone, by detecting the hidden camera using the red filter of a movable (or may be operated to cover or not to cover) detector, a performance thereof may be maximized.

Figure 6:
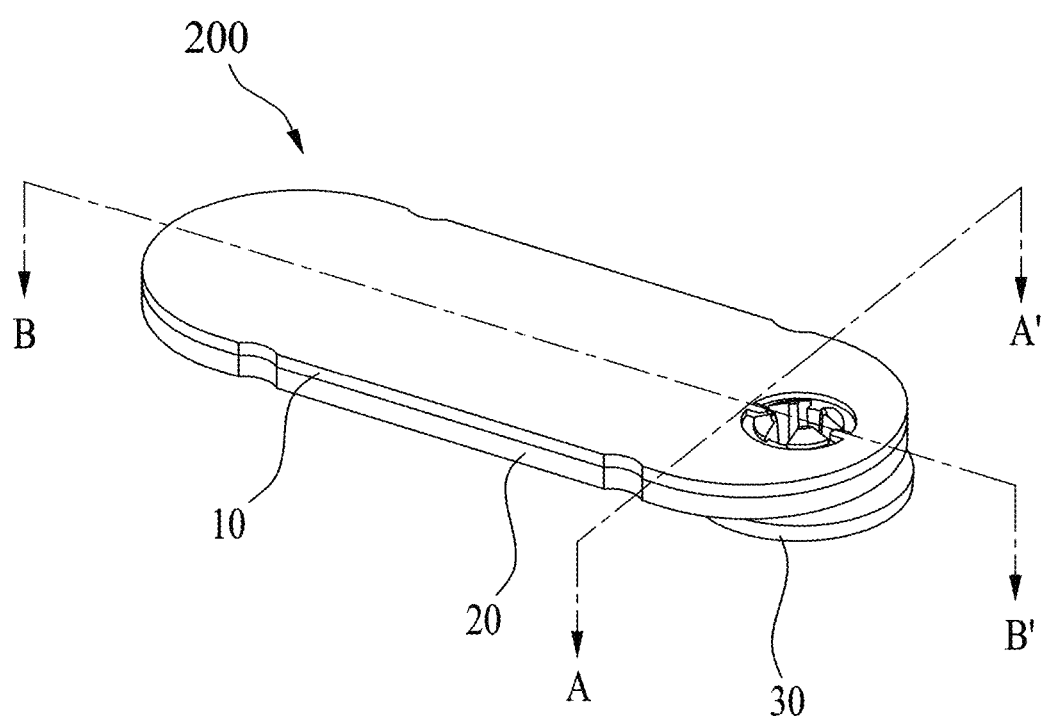
FIG. 6 is a perspective view illustrating in detail a detector according to another embodiment of the mobile phone case of FIG. 1.
Figure 7:
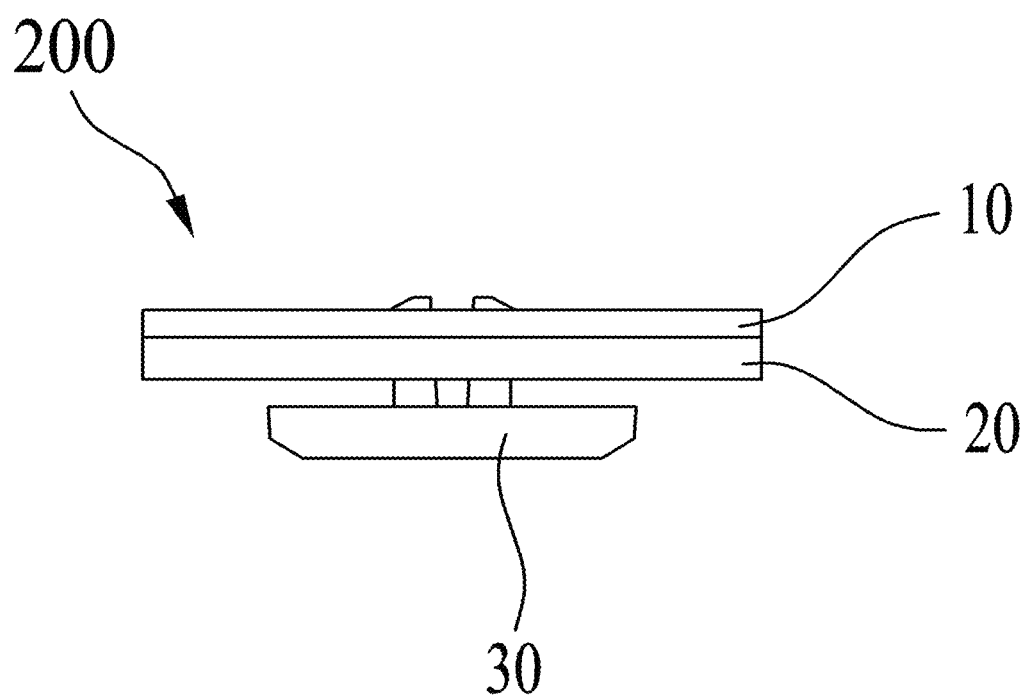
FIG. 7 is a cross-sectional view illustrating the detector taken along line AA' of FIG. 6.
Figure 8:
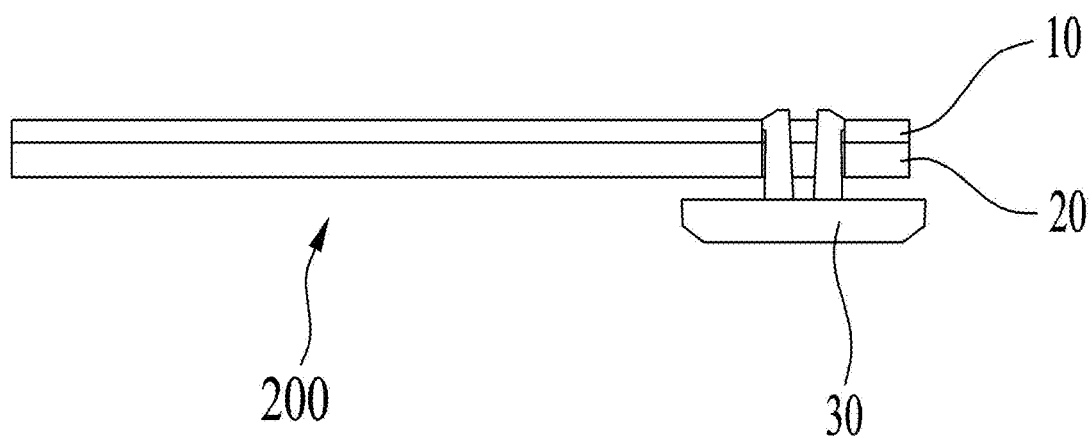
FIG. 8 is a cross-sectional view illustrating the detector taken along line B-B' of FIG. 6.

FIG. 6 is a perspective view illustrating in more detail the detector according to another embodiment of the mobile phone case of FIG. 1. Further, FIG. 7 is a cross-sectional view illustrating the detector taken along line AA' of FIG. 6, and FIG. 8 is a cross-sectional view illustrating the detector taken along line BB' of FIG. 6.

Referring to FIGS. 6 to 8 and FIGS. 1 to 4, the detector 200 according to another embodiment of the present disclosure will be described in more detail. The detector 200 may include a support 20 coupled to a red filter 10 and one surface of the red filter 10, having a thickness in a range of 0.5 mm to 0.8 mm, and made of a transparent material. That is, in the case of FIG. 5, the detector 200 may be made of a material that emits light having a red wavelength, and thus the detector 200 may be formed in a single layer to perform a function of a red filter, but in the case of FIGS. 6 to 8, the red filter 10 is coupled to the support 20.

The red filter 10 may be made of a thin material, and in this case, durability may be weakened. Therefore, by coupling the support 20 made of a transparent material in a range of 0.5 mm to 0.8 mm to the red filter 10, durability is improved, and the red filter 10 may be prevented from being damaged by other factors such as external moisture or dust. Even while preventing increase in thickness of the mobile phone case in a thickness range of the support 20, damage of the red filter 10 may be more effectively prevented. The support 20 may be made of a material such as a polyvinyl chloride (PVC) material, a polycarbonate (PC) material, and an acrylic material, but the present disclosure is not particularly limited thereto.

Although not illustrated separately, the red filter 10 and the support 20 are coupled to each other between surfaces, and although not illustrated in the drawings, the red filter 10 and the support 20 may be bonded with interposed an adhesive of a transparent material therebetween in order to bond the red filter 10 and the support 20, as needed. The adhesive may include, for example, an optical clear resin (OCR).

As already described above, it is characterized in that the red filter 10 relatively more transmits light of a red wavelength in a wavelength range of 600 nm to 700 nm among light emitted from the LED light source of the mobile phone. The LED light source emits light in various wavelength bands, and the red filter 10 mainly passes through light of a red wavelength in a wavelength range of 600 nm to 700 nm and thus light in the red wavelength band passes through the support 20 made of a transparent material to be emitted to the outside of the user's mobile phone case. Thereafter, the camera recognizes light reflected from the lens core of the hidden camera and the display of the mobile phone displays the light, whereby the user may recognize presence and a position of the hidden camera.

Figure 9:
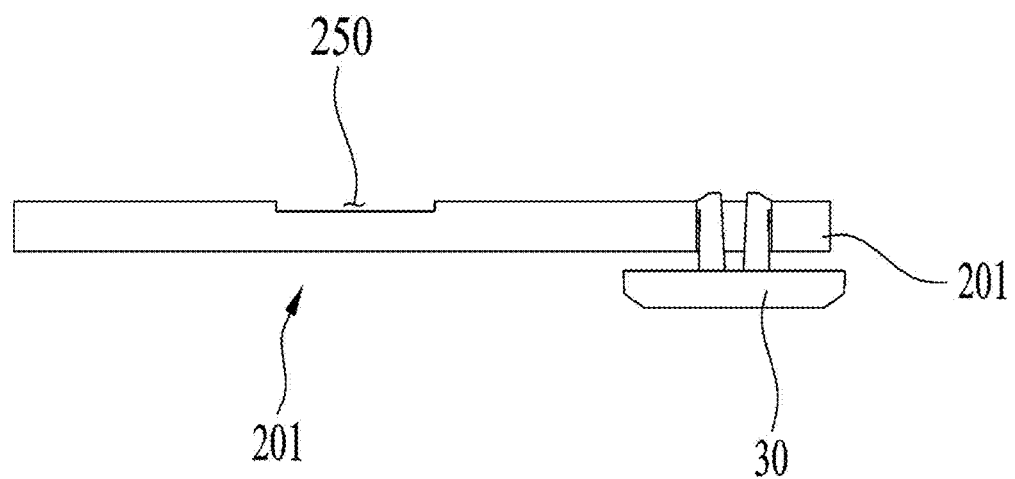
FIG. 9 is a cross-sectional view illustrating a detector in which the same portion as that of FIG. 7 is cut according to another embodiment of the present disclosure.
Figure 10:
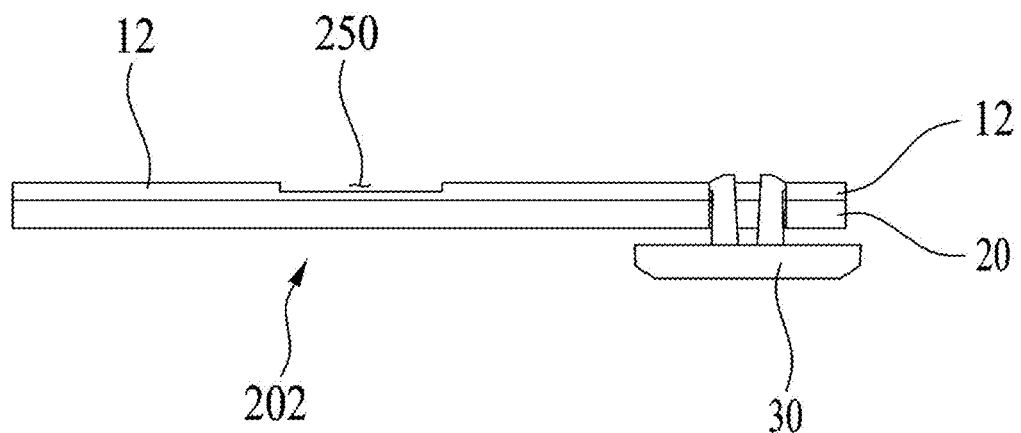
FIG. 10 is a cross-sectional view illustrating a detector in which the same portion as that of FIG. 7 is cut according to another embodiment of the present disclosure.

FIGS. 9 and 10 are cross-sectional views illustrating a detector cut in the same manner as that of FIG. 7 according to another embodiment of the present disclosure. FIG. 9 illustrates a case in which a red filter is integrally formed with a detector 201, as illustrated in FIG. 5, and FIG. 10 illustrates a structure in which a detector 202 is coupled to the red filter 10 and the support 20, as illustrated in FIG. 6. Referring to FIGS. 9 and 10, the detectors 201 and 202 according to another embodiment of the present disclosure further includes an anti-reflection portion 250 recessed inward at a position adjacent to the mobile phone, and it is characterized in that the anti-reflection portion 250 is formed at a position corresponding to the LED light source of the mobile phone.

The anti-reflection portion 250 may prevent light emitted from the LED light source of the mobile phone from directly entering to the camera of the mobile phone by reflection instead of being emitted to the outside through the red filter by going straight. That is, light emitted from the LED light source of the mobile phone is reflected by the adjacent red filter and thus undesired light may be transferred to the camera of the mobile phone, whereby a problem may occur that the photographed image appears cloudy in the display or that a glare phenomenon occurs or that distortion occurs in an image of the display. However, as in the present disclosure, by forming the anti-reflection portion 250, most of light emitted from the LED light source of the mobile phone may be directed to the outside by total reflection. Thereby, a phenomenon may be effectively prevented in which a distorted image appears on the display of the mobile phone.

For this reason, for example, it is characterized in that the anti-reflection portion 250 covers all of a horizontal cross-section of the LED light source on a vertical line. Further, it is characterized in that the anti-reflection portion 250 does not overlap a horizontal cross-section on a vertical line with the camera of the mobile phone. That is, the anti-reflection portion 250 overlaps a horizontal cross-section on a vertical line with the LED light source of the mobile phone and does not overlap a horizontal cross-section on the vertical line with the camera and thus light emitted from the LED light source of the mobile phone does not affect light incident to the camera of the mobile phone from the outside while preventing image distortion from occurring by reflection and thus a more precise image may be captured by the camera and displayed on the display of the mobile phone.

As illustrated in FIG. 10, when the red filter 12 separately exists, the anti-reflection portion 250 may have a structure in which only a part of the red filter 12 is recessed. In other words, a recessed portion 250 is formed in a direction toward the support 20 from the red filter 12, and the recessed portion 250 may be recessed to a part that does not contact the support 20 while being recessed in a direction toward the support 20 from the red filter 12. This is because when the recessed portion 250 formed in the red filter 12 reaches the support 20, the red filter 12 may not function as a red filter that filters light emitted from the LED light source with light having a red wavelength. Further, the anti-reflection portion may be formed by, for example, CNC machining.

Figure 11:
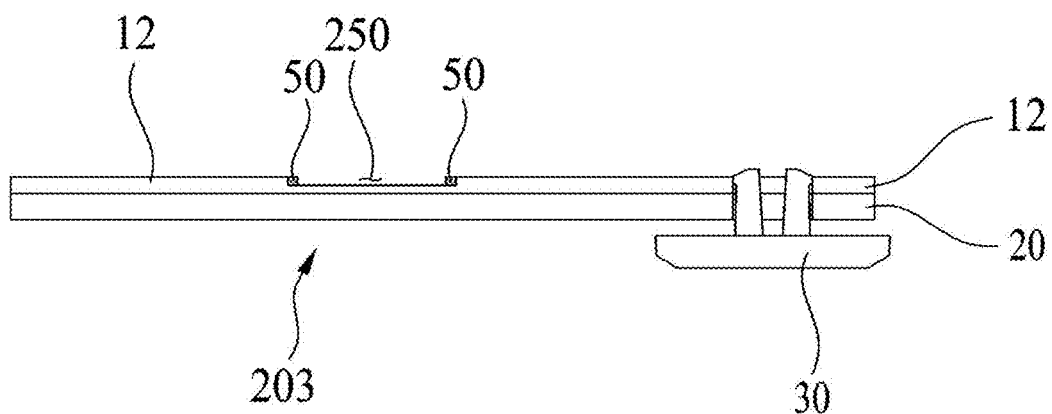
FIG. 11 is a cross-sectional view illustrating a detector in which the same portion as that of FIG. 7 is cut according to another embodiment of the present disclosure.

FIG. 11 is a cross-sectional view illustrating the detector cut in the same manner as that of FIG. 7 according to another embodiment of the present disclosure. Referring to FIG. 11, the anti-reflection portion 250 may further include a light absorber 50 made of a material absorbing light in a recessed inner wall. The light absorber 50 may more effectively prevent light emitted from the LED light source of the mobile phone from being transmitted to the camera of the mobile phone by reflection at the inside instead of being emitted to the outside. That is, light traveling to the camera of the mobile phone may increase through reflection of a portion adjacent to the LED light source of the mobile phone or a recessed inner wall of the anti-reflection portion 250, and by forming a light absorbing material that absorbs light in a recessed inner wall of the anti-reflection portion 250, the light absorbing material may perform a kind of buffering action. As a material constituting the light absorber 50, a material that absorbs light is not particularly limited. Further, FIG. 11 illustrates that the light absorber 50 is formed in the red filter 12 of the detector 200 having a structure in which the red filter 12 and the support 20 are coupled, but the present disclosure is not limited thereto and even when the detector 200 is formed in a single layer, the detector 200 may be formed at an inner wall of a recessed portion.

Figure 12:
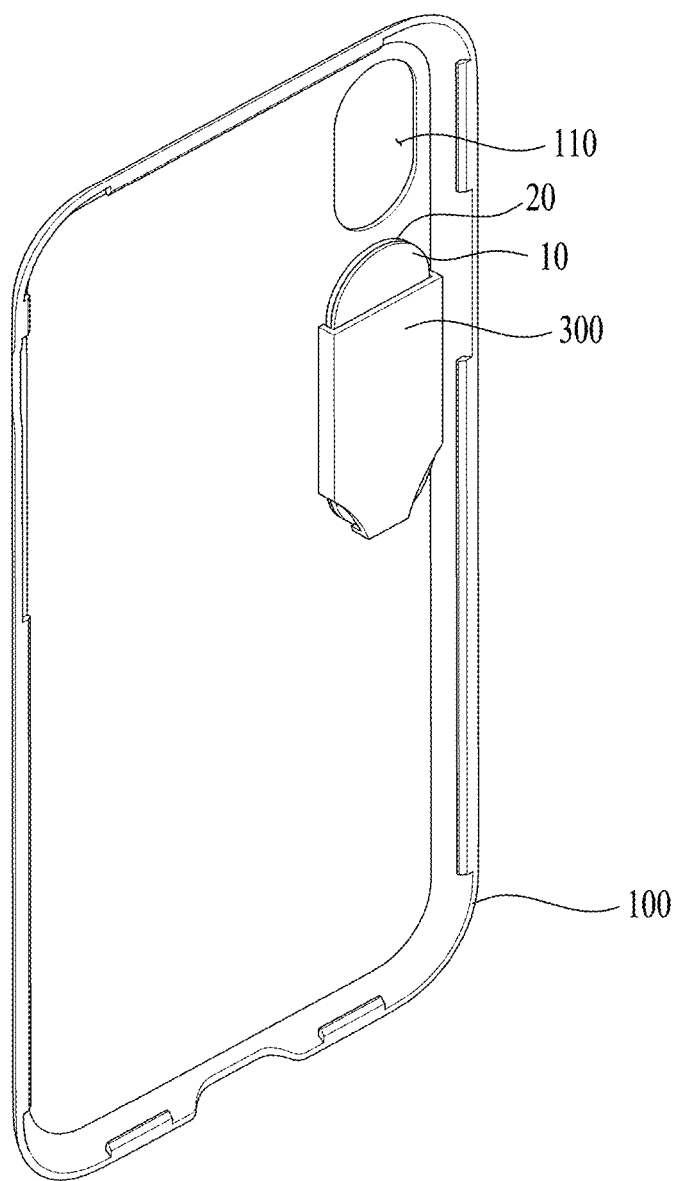
FIG. 12 is a schematic front perspective view illustrating a lowered detector of a mobile phone case according to another embodiment of the present disclosure.
Figure 13:
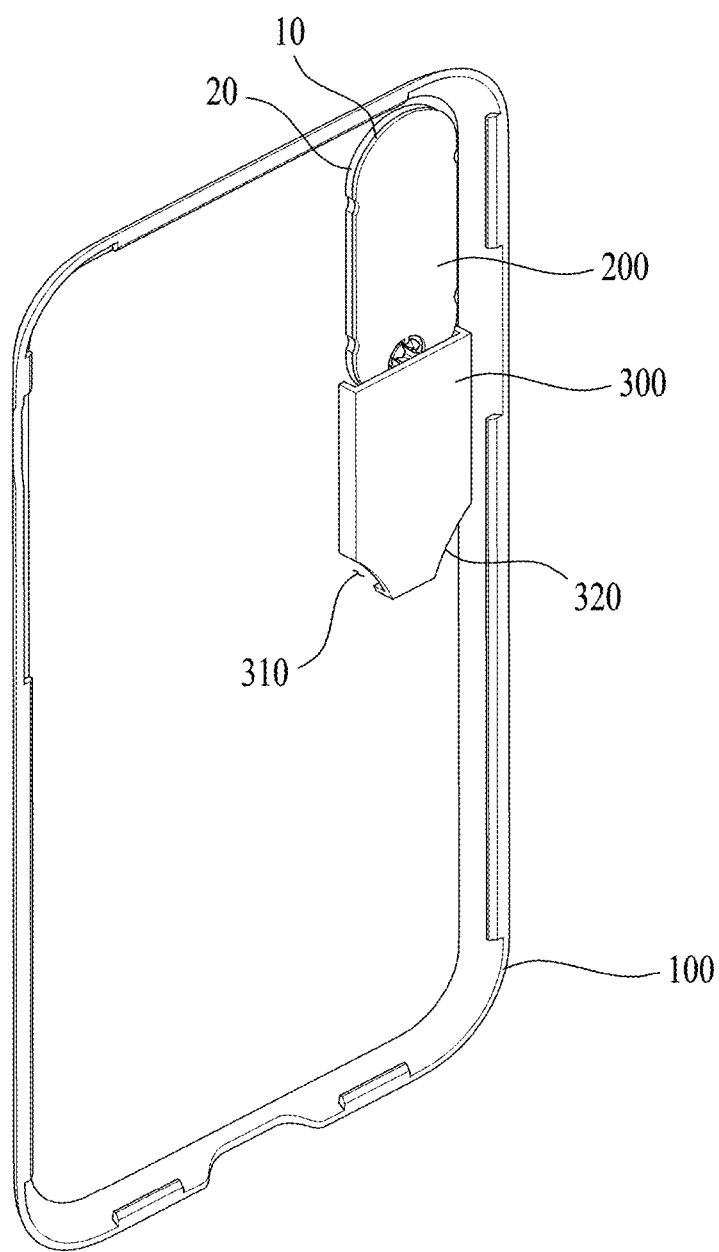
FIG. 13 is a schematic front perspective view illustrating a raised detector of a mobile phone case of FIG. 12.

FIG. 12 is a schematic front perspective view when the detector of the mobile phone case is lowered according to another embodiment of the present disclosure, and FIG. 13 is a schematic front perspective view when the detector of the mobile phone case of FIG. 12 is raised.

Referring to FIGS. 12 and 13, in the mobile phone case according to another embodiment of the present disclosure, the case body 100 includes a first receiving portion 300 formed in one surface to which the mobile phone is coupled and for receiving at least a portion of the detector, and it is characterized in that at least a portion of the detector 200 may be received with interposed between the first receiving portion 300 and one surface of the case body 100.

The detector 200 may be prevented from being damaged through contact with the inside of the mobile phone through the first receiving portion 300, and the first receiving portion 300 may prevent the detector 200 from moving vertically or laterally by contact or pressing with other members. That is, the first receiving portion 300 may serve as a safety cap that enables the detector 200 to easily move without being damaged. The first receiving portion 300 may be configured in a cross-sectional form of a letter "E" and be coupled to one surface of the case body 100.

It is characterized in that the first receiving portion 300 further includes first damage prevention portions 310 and 320 opened in a horizontal plane direction formed by one surface of the case body 100 at positions of both ends of a direction opposite to a direction in which an opening is formed. That is, the first damage prevention portions 310 and 320 are opened in a downward direction in the drawing, thereby preventing damage of the detector 200. More specifically, an end portion of the detector 200 may contact the first damage prevention portions 310 and 320 by moving, and when an end portion of the detector 200 contacts the first damage prevention portions 310 and 320 by a strong force, the end portion may be damaged, and by providing the first damage prevention portions 310 and 320, the end portion of the detector 200 may be prevented from being damaged. In other words, when entire damage in a plane direction of the detector 200 is prevented by the first receiving portion 300, by preventing damage of the end portion of the detector 200 that may be more easily damaged by the first damage prevention portions 310 and 320, durability may be more maximized.

Further, it is characterized in that the first damage prevention portions 310 and 320 are opened in a direction perpendicular to a horizontal plane direction formed by one surface of the case body 100. That is, the detector 200 may be damaged by contacting with a part of the first receiving portion 300 while moving in a vertical direction, and the first damage prevention portions 310 and 320 are opened in the vertical direction in this way, whereby damage of an end portion of the detector 200 may be effectively prevented.

Figure 14:
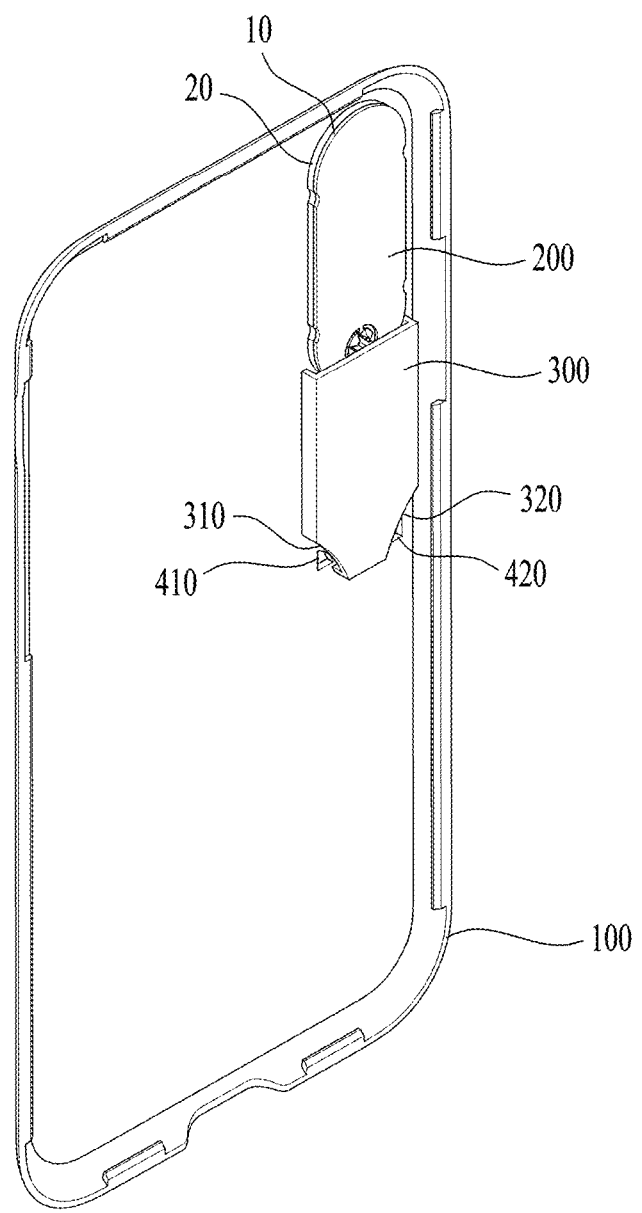
FIG. 14 is a schematic front perspective view illustrating a raised detector of a mobile phone case according to another embodiment of the present disclosure.

FIG. 14 is a schematic front perspective view illustrating a raised detector of a mobile phone case according to another embodiment of the present disclosure.

Referring to FIG. 14, the mobile phone case according to another embodiment of the present disclosure may further include first engraving portions 410 and 420 recessed inward from one surface of the case body 100, and when the detector 200 is received in the first receiving portion 300, it is characterized in that the first engraving portions 410 and 420 are overlapped in a vertical line with at least a portion of the detector 200. Thereby, by reducing a contact between the detector 200 and one surface of the case body 100, damage may be more effectively prevented. It is illustrated in the drawing that one first engraving portion is formed at one position, but the present disclosure is not limited thereto and several first engraving portions may be formed at adjacent positions, as needed.

Figure 15:
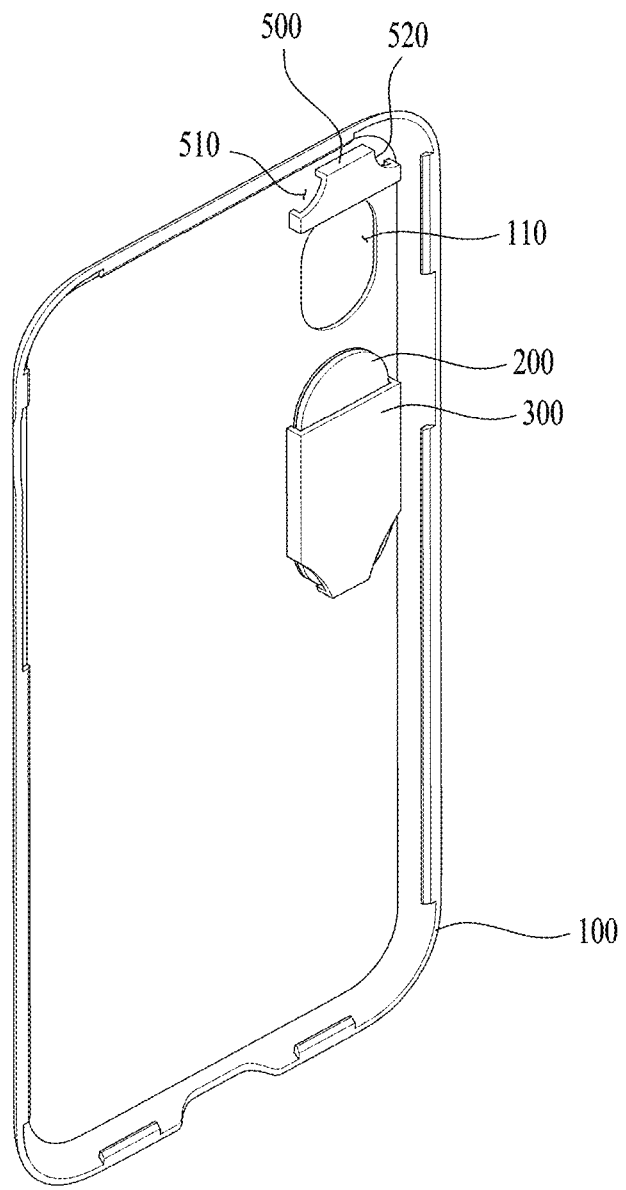
FIG. 15 is a schematic front perspective view illustrating a lowered detector of a mobile phone case according to another embodiment of the present disclosure.
Figure 16:
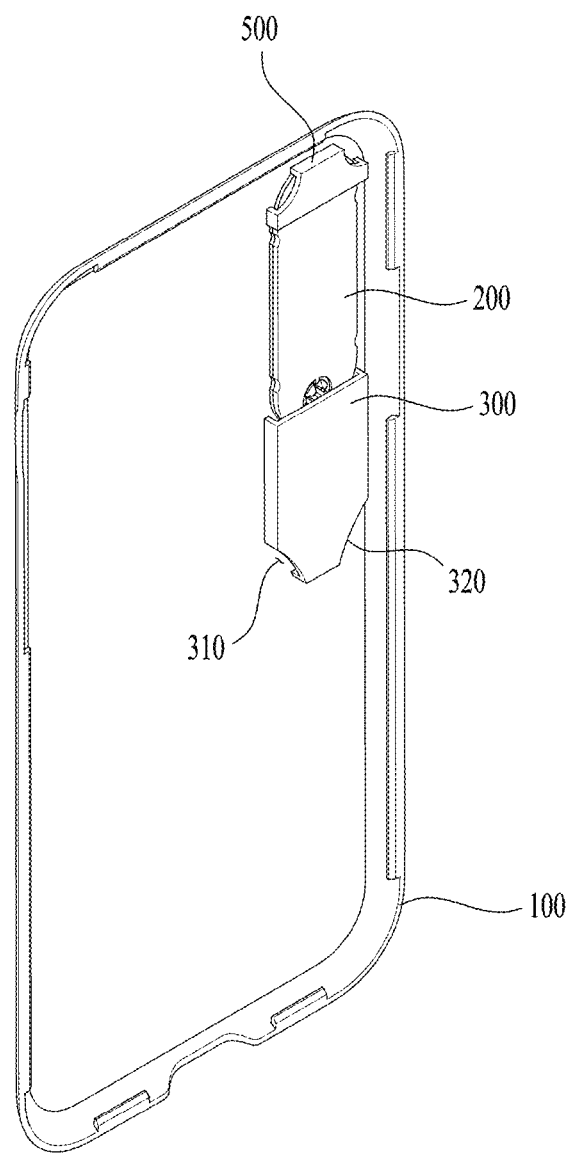
FIG. 16 is a schematic front perspective view illustrating a raised detector of the mobile phone case of FIG. 15.

FIG. 15 is a schematic front perspective view when the detector of the mobile phone case is lowered according to another embodiment of the present disclosure, and FIG. 16 is a schematic front perspective view when the detector of the mobile phone case of FIG. 15 is raised.

Referring to FIGS. 15 and 16, in the mobile phone case according to another embodiment of the present disclosure, the case body 100 includes a second receiving portion 500 formed at one surface to which the mobile phone is coupled and for receiving at least a portion of the detector 200, and it is characterized in that at least a portion of the detector 200 is received with interposed between the second receiving portion 500 and one surface of the case body 100. Further, when the detector 200 covers the opening 110, it is characterized in that at least a portion of the detector 200 is received in the second receiving portion 500.

As in the above-described first receiving portion 300, the second receiving portion 500 may effectively prevent damage of the detector 200. That is, the detector 200 may prevent from being damaged through contact with the inside of the mobile phone through the second receiving portion 500, and the second receiving portion 500 may prevent the detector 200 from moving vertically or laterally by a contact or pressing with other members. Further, when the detector 200 is inserted into the second receiving portion 500, the detector 200 may be more securely fixed to prevent from shaking. In other words, the second receiving portion 500 may serve as a safety cap that enables the detector 200 to easily move without being damaged. The second receiving portion 500 may be configured in a cross-section shape of a letter "⊏" and be coupled to one surface of the case body 100.

It is characterized in that the second receiving portion 500 further includes second damage prevention portions 510 and 520 opened in a horizontal plane direction formed by one surface of the case body 100 at positions of both ends in a direction opposite to a direction in which the opening is formed. That is, the second damage prevention portions 510 and 520 are opened in an upward direction in the drawing, whereby when the detector 200 is raised to detect a hidden camera, damage of the detector 200 may be prevented more effectively. More specifically, when the detector 200 is used for detection of a hidden camera, the detector 200 is inserted into the second damage prevention portions 510 and 520 by movement, and the second damage prevention portions 510 and 520 may contact upper end portions of the detector 200, and the end portion may be damaged when the second damage prevention portions 510 and 520 contact upper end portions of the detector 200 by a strong force and thus by providing the second damage prevention portions 510 and 520, the end portion of the detector 200 may be prevented from being damaged. In other words, when entire damage in a plane direction of the detector 200 is prevented by the second receiving portion 500, by preventing damage of an upper end portion of the detector 200 that may be more easily damaged by the second damage prevention portions 510 and 520, durability may be more maximized.

Further, it is characterized in that the second damage prevention portions 510 and 520 are opened in a direction perpendicular to a horizontal plane direction formed by one surface of the case body 100. That is, the detector 200 may be damaged by contact with a part of the second receiving portion 500 while moving or shaking in a vertical direction, and by an opening in a vertical direction, damage of an end portion of the detector 200 may be effectively prevented.

Although not separately illustrated, as in the first engraving portions 410 and 420 of FIG. 14, the mobile phone case may further include a second engraving portion recessed inward from one surface of the case body, and when the detector 200 is received in the second receiving portion 500, it is characterized in that the second engraving portion is overlapped in a vertical line with at least a portion of the detector 200, and as in the first engraving portion, at a periphery of the second receiving portion 500, by reducing a contact area between the detector 200 and one surface of the case body 100, a damage prevention effect may be more maximized.

Figure 17:
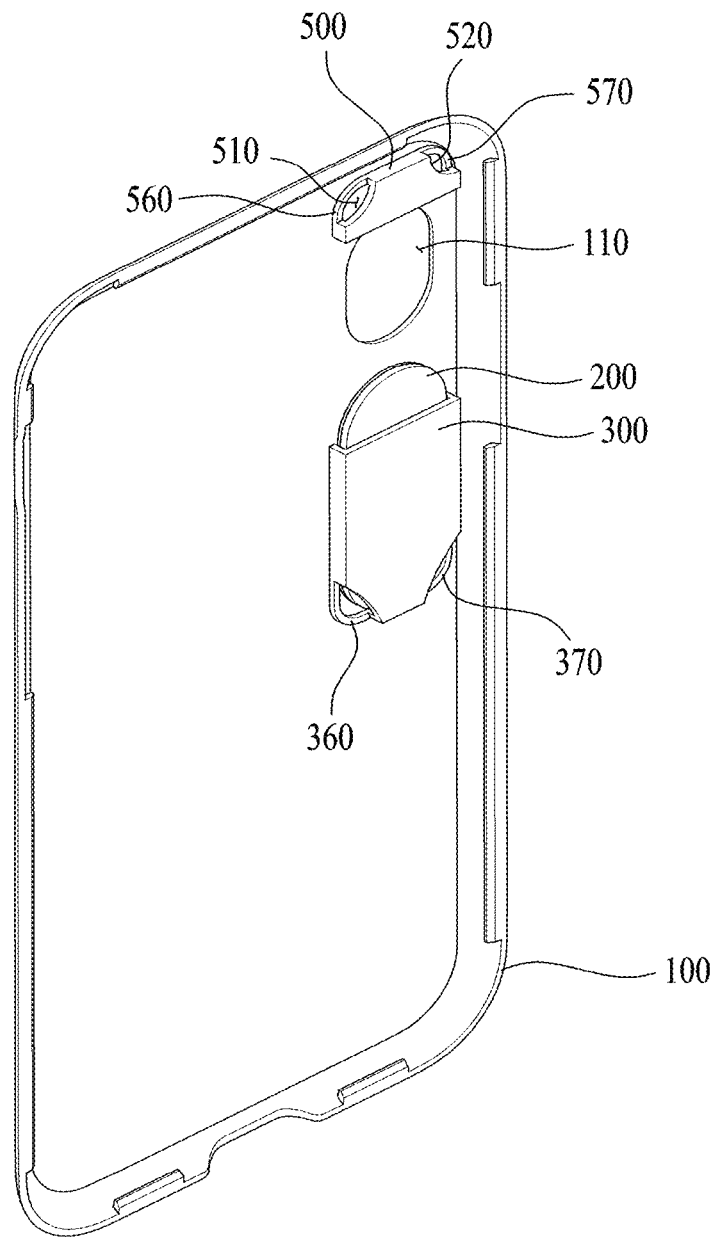
FIG. 17 is a schematic front perspective view illustrating a lowered detector of a mobile phone case according to another embodiment of the present disclosure.
Figure 18:
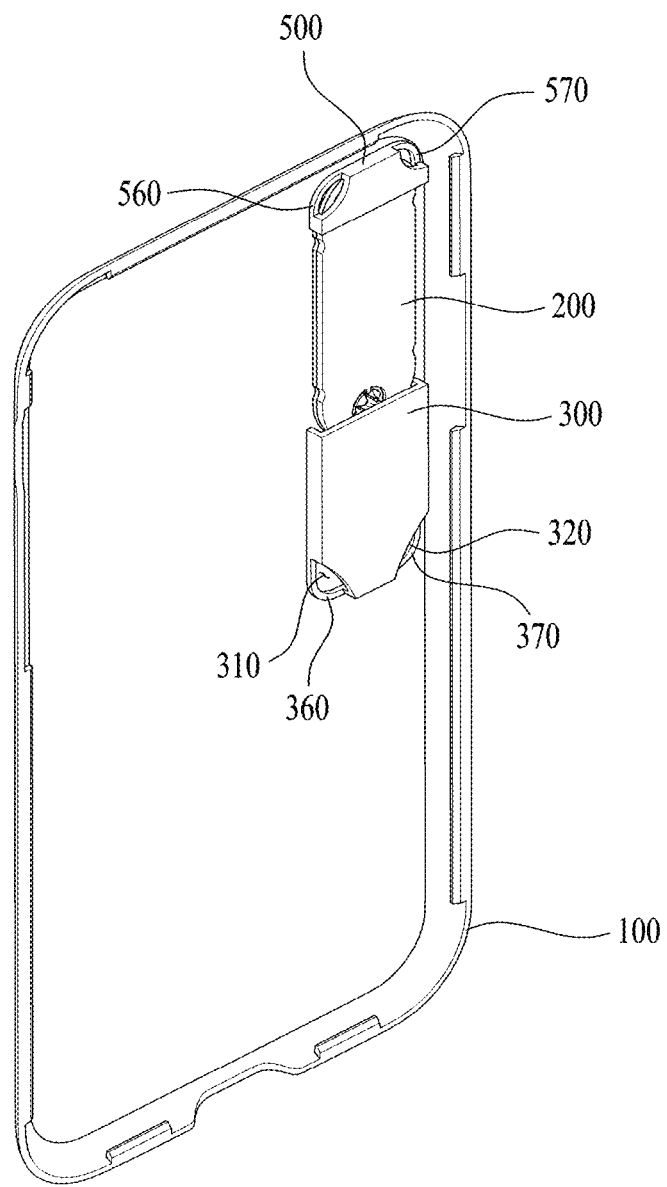
FIG. 18 is a schematic front perspective view illustrating a raised detector of the mobile phone case of FIG. 17.

FIG. 17 is a schematic front perspective view when the detector of the mobile phone case is lowered according to another embodiment of the present disclosure, and FIG. 18 is a schematic front perspective view when the detector of the mobile phone case of FIG. 17 is raised.

Referring to FIGS. 17 and 18, in the mobile phone case according to another embodiment of the present disclosure, the first receiving portion 300 further includes first support lines 360 and 370 extended from one end to the other end of an opening in which the first damage prevention portions 310 and 320 are formed and contacting one surface of the case body 100, and the first support lines 360 and 370 have a height lower than that of the first receiving portion 300 in which the first damage prevention portions 310 and 320 are not formed, and when the detector 200 is received in the first receiving portion 300, it is characterized in that the detector 200 is positioned above the first support lines 360 and 370.

The first support lines 360 and 370 may have a height lower than that of the first receiving portion 300 in which the first damage prevention portions 310 and 320 are not formed, thereby not disturbing a movement of the detector. Further, the first support lines 360 and 370 may reinforce as a whole strength of the first receiving portion 300 at a position in which the first damage prevention portions 310 and 320 are formed. That is, when the first receiving portion 300 includes the first damage prevention portions 310 and 320, strength of the first receiving portion 300 may be reduced by an open space, and the first support lines 360 and 370 are formed to fix at both sides a portion of an opening in which the first damage preventing portions 310 and 320 are formed, thereby reinforcing strength.

Further, the second receiving portion 500 further includes second support lines 560 and 570 extended from one end to the other end of an opening in which the second damage prevention portions 510 and 520 are formed and contacting one surface of the case body 100, and the second support lines 560 and 570 have a height lower than that of the second receiving portion 500 in which the second damage prevention portions 510 and 520 are not formed. When the detector 200 is received in the second receiving portion 500, it is characterized in that the detector 200 is positioned above the second support lines 560 and 570.

The second support lines 560 and 570 may also have a height lower than that of the second receiving portion 500 in which the second damage prevention portions 510 and 520 are not formed, thereby not disturbing a movement of the detector. Further, the second support lines 560 and 570 may reinforce strength of the second receiving portion 500 as a whole at positions in which the second damage prevention portions 510 and 520 are formed. That is, when the second receiving portion 500 includes the second damage prevention portions 510 and 520, strength of the second receiving portion 500 may be reduced by an open space and the second support lines 560 and 570 are formed to fix at both sides a portion of an opening in which the second damage prevention portions 510 and 520 are formed, thereby reinforcing strength.

Figure 19:
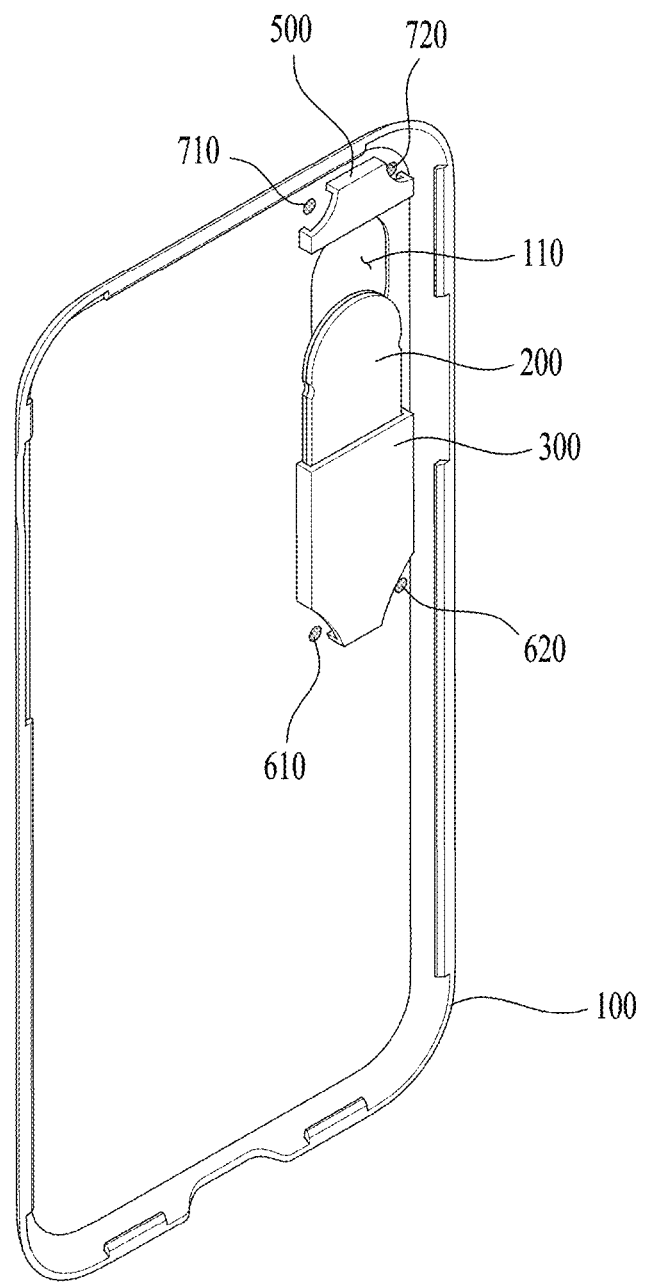
FIG. 19 is a schematic front perspective view illustrating a detector of a mobile phone case positioned at an intermediate point according to another embodiment of the present disclosure.

FIG. 19 is a schematic front perspective view when a detector of the mobile phone case is positioned at an intermediate point according to another embodiment of the present disclosure.

Referring to FIG. 19, the mobile phone case according to another embodiment of the present disclosure may further include at least one first buffering portions 610 and 620 protruded from one surface of the case body 100 and formed with an elastic member, and when the detector 200 is received in the first receiving portion 300, it is characterized in that the first buffering portions 610 and 620 contact at least a portion of the detector 200.

When the detector 200 reaches a predetermined position, the first buffering portions 610 and 620 reduce a speed by contact with the detector 200 and thus the first buffering portions 610 and 620 may prevent the detector 200 from being damaged by contact with a part of the first receiving portion 300. Further, a magnitude of a force transferred to the user's hand is changed and thus when the detector 200 reaches the first buffering portions 610 and 620, the user may enable to recognize that the detector 200 is lowered to a somewhat necessary position, by applying less a force to the operation unit 30 for moving the detector 200, the detector 200 and other components may be prevented from being damaged by an excessive force.

Further, in addition to damage of other components including the detector 200, the detector may move at unnecessary timing by the first buffering portions 610 and 620 to prevent from disturbing an original function of the mobile phone by covering the opening 110 of the case body 100. That is, when the user lowers the detector 200 through the operation unit 30 (when the user uses a hidden camera detection function and lowers the detector 200 in order to not use the hidden camera detection function), the first buffering portions 610 and 620 may perform a stopper function for preventing from being damaged by an excessive force or an impact, and in a situation in which a hidden camera detection function is unnecessary, when the user does not use the detector 200 (i.e., when a state is maintained in which the detector is lowered), the first buffering portions 610 and 620 may perform a stopper function of preventing from covering the opening 110 of the case body 100 by an undesirable movement of the detector 200.

The mobile phone case may further include at least one second buffering portions 710 and 720 protruded from one surface of the case body 100 and formed with an elastic member, and when the detector 200 is received in the second receiving portion 500, it is characterized in that the second buffering portions 710 and 720 contact at least a portion of the detector 200. As in the first buffering portions 610 and 620, when the user raises the detector 200 to detect a hidden camera, the detector 200 may be undesirably lowered to prevent from performing a hidden camera detection function, and when the detector is raised to be received in the second receiving portion 500, the second buffering portions 710 and 720 may perform a stopper function to prevent the detector 200 from being damaged by an impact.

A material of the first buffering portions 610 and 620 and the second buffering portions 710 and 720 may be made of an elastic material, and may be made of, for example, a material such as rubber or silicon and it is not particularly limited to anyone. Further, even when the first receiving portion 300 and/or the second receiving portion 500 do/does not exist, the first buffering portions 610 and 620 and the second buffering portions 710 and 720 may exist. In this case, when the detector 200 moves to be used for detection of a hidden camera and reaches a specific position, the first buffering portions 610 and 620 and the second buffering portions 710 and 720 may contact at least a portion of the detector 200 or when the detector 200 reaches a specific position not to use (i.e., when an original function of the mobile phone is used), the first buffering portions 610 and 620 and the second buffering portions 710 and 720 may contact at least a portion of the detector 200 to perform a stopper function.

Figure 20:
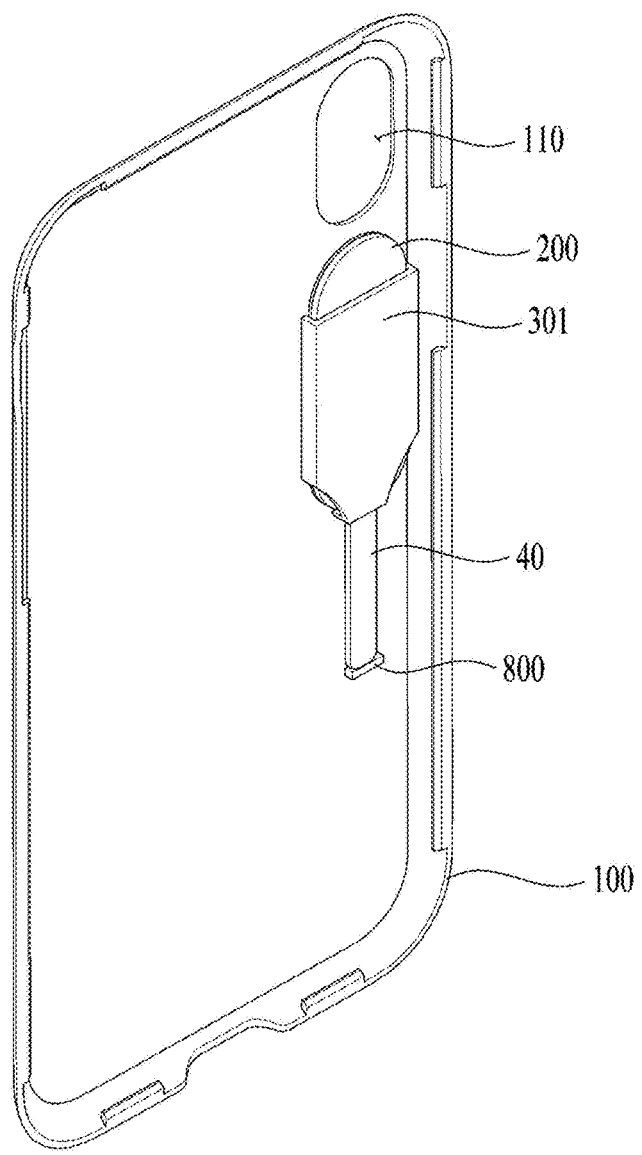
FIG. 20 is a schematic front perspective view illustrating a lowered detector of a mobile phone case according to another embodiment of the present disclosure.
Figure 21:
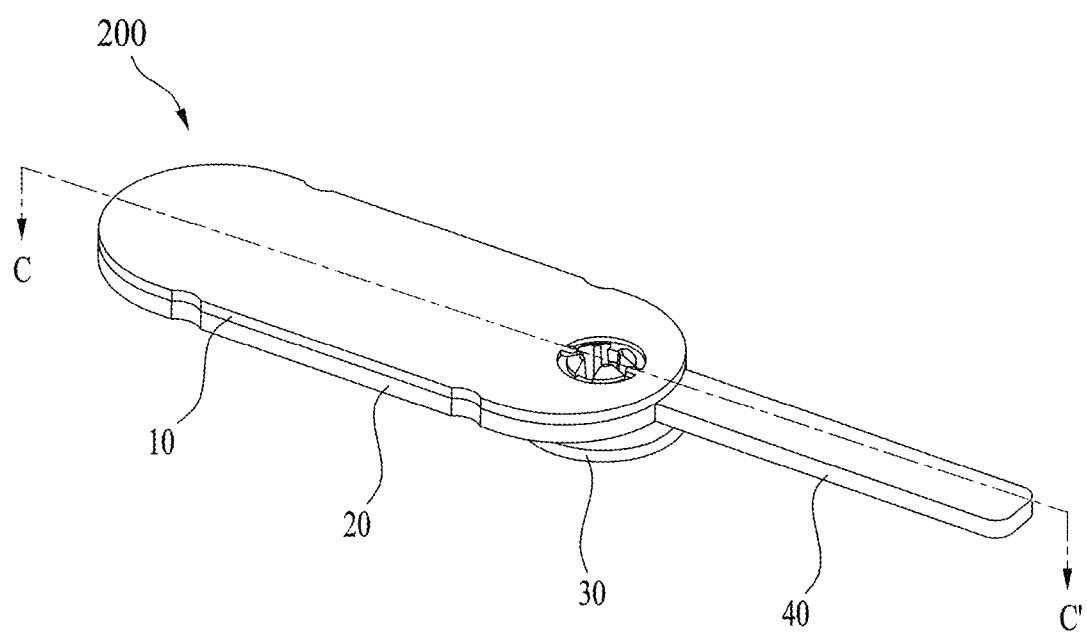
FIG. 21 is a perspective view illustrating in more detail a detector of the mobile phone case of FIG. 20.

FIG. 20 is a schematic front perspective view when a detector of a mobile phone case is lowered according to another embodiment of the present disclosure, and FIG. 21 is a perspective view illustrating in detail the detector of the mobile phone case of FIG. 20. Further, FIG. 22 is a cross-sectional view illustrating the detector taken along a line C-C' of FIG. 21.

Figure 22:
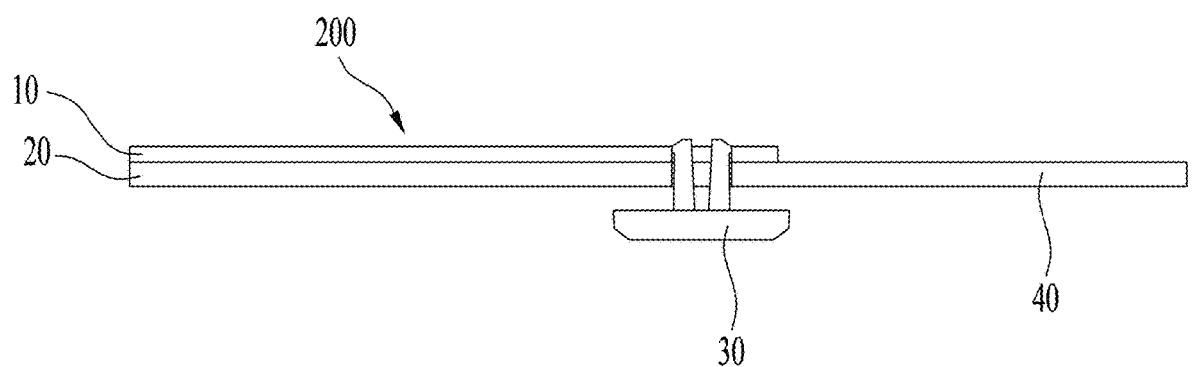
FIG. 22 is a cross-sectional view illustrating the detector taken along line CC' of FIG. 21.

Referring to FIGS. 20 to 22, the mobile phone case according to another embodiment of the present disclosure further includes a cover 40 coupled to a portion of the operation unit 30 and a portion of the detector 200, and when the detector 200 covers the opening 110, it is characterized in that the cover 40 may cover all of the guide lines 120. When the detector 200 is raised upward for detection of a hidden camera, external moisture, dust, or the like may be introduced into the guide line, and in a situation in which the detector 200 is raised upward, the cover 40 may cover the guide line 120, which is a kind of passage into which external moisture, dust, or the like may be introduced and thus the cover 40 disconnects the inside of the mobile phone case from the outside to prevent contamination of the inside of the mobile phone case. In particular, as described above, when there is a separate cover member between the case body 100 and the mobile phone, dust or moisture may be introduced and accumulated in a space between the cover member and the case body 100 through the guide line 120 and thus such a contamination phenomenon may be effectively prevented by the cover 40.

The cover 40 may be coupled to a part of the detector, and the cover 40 may be formed by extension of a portion of the detector in addition to coupling, and preferably, the cover 40 may contact one surface of the case body 100. When the cover 40 contacts one surface of the case body 100, a space between the outside and the inside of the mobile phone case may be more precisely sealed.

When the cover 40 exists, the cover 40 may further include a stopper 800 protruded from one surface of the case body 100, and when the detector 200 is received in a first receiving portion 301, it is characterized in that the stopper 800 may stop a movement of the detector by contact with the cover 40. That is, when the detector 200 is lowered not to use, the stopper 800 may perform a function of preventing a movement of the detector 200 or the operation unit 30 operating the detector 200 so that the stopper 800 is no longer lowered at the end of the cover 40.

Further, when the cover 40 exists, the first receiving portion 301 may include a penetration portion (not illustrated) that is opened to enable the cover 40 to penetrate. While the penetration portion enables the detector 200 coupled to the cover 40 to easily move together, the penetration portion may prevent damage of the detector 200 by the first receiving portion 301.

Figure 23:
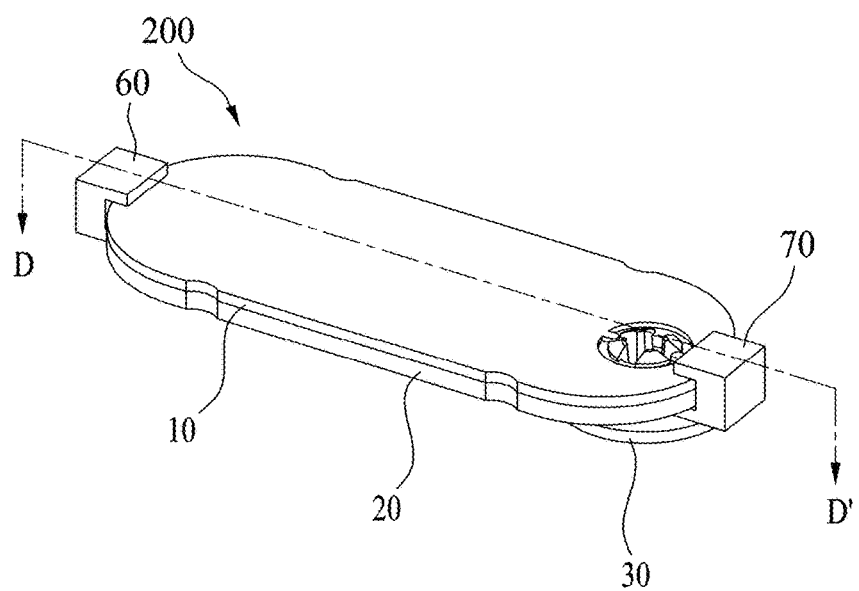
FIG. 23 is a perspective view illustrating a detector according to another embodiment of the present disclosure.
Figure 24:
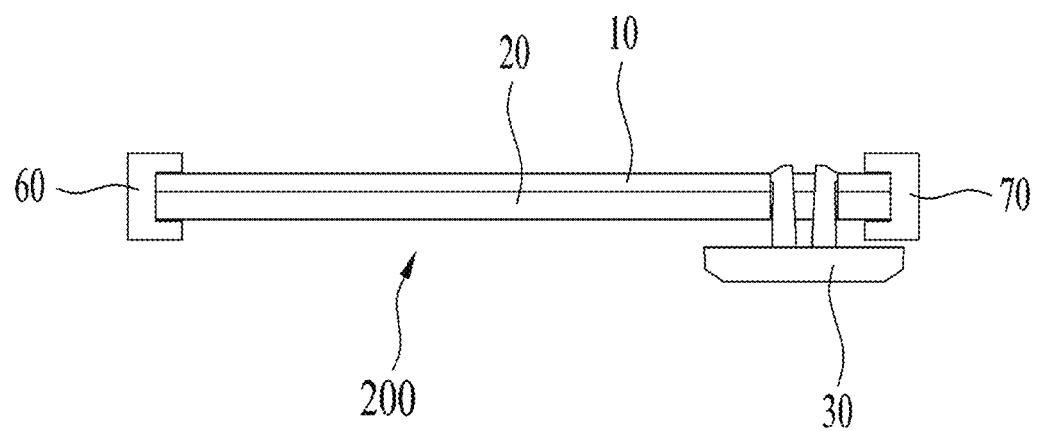
FIG. 24 is a cross-sectional view illustrating a detector taken along line D-D' of FIG. 23.
Figure 25:
FIGS. 25 to 28 are pictures of an actual mobile phone case according to an embodiment of the present disclosure.
Figure 26:
Figure 27:
Figure 28:

FIG. 23 is a perspective view illustrating a detector according to another embodiment of the present disclosure, and FIG. 24 is a cross-sectional view illustrating the detector taken along line D-D' of FIG. 23.

Referring to FIGS. 23 and 24, in a mobile phone case according to another embodiment of the present disclosure, it is characterized in that the detector 200 further includes a fastening portion 70 for binding the red filter 10 and the support 20 at both ends facing each other. The fastening portion 70 may prevent very effectively a phenomenon in which the red filter 10 and the support 20 are separated from each other. That is, when the detector 200 is used for a long time, if the number increases in which the detector 200 vertically or horizontally moves, durability may be gradually weakened or a phenomenon may occur in which the red filter 10 and the support 20 are separated from each other by factors such as contact between other members, and by binding the red filter 10 and the support 20 at both ends facing each other by the fastening portion 70, such a separation phenomenon may be prevented and durability may be improved.

Embodiment

Referring to FIGS. 25 to 28, pictures are illustrated in various directions of a mobile phone case according to an embodiment of the present disclosure. Experimental Examples 1 and 2 were carried out by mounting a mobile phone case produced according to an embodiment of the present disclosure.

Experimental Example 1

Figure 29:
FIG. 29 is a picture of a hidden camera in a state in which a mobile phone case of the present disclosure is mounted in a mobile phone according to Experimental Example 1.

After a mobile phone case according to an embodiment of the present disclosure is mounted in a mobile phone, a hidden camera was photographed, and FIG. 29 illustrates a picture of the photographed result. Referring to FIG. 29, it may be determined that the hidden camera may be clearly detected by the mobile phone case according to the present disclosure.

Experimental Example 2

Figure 30:
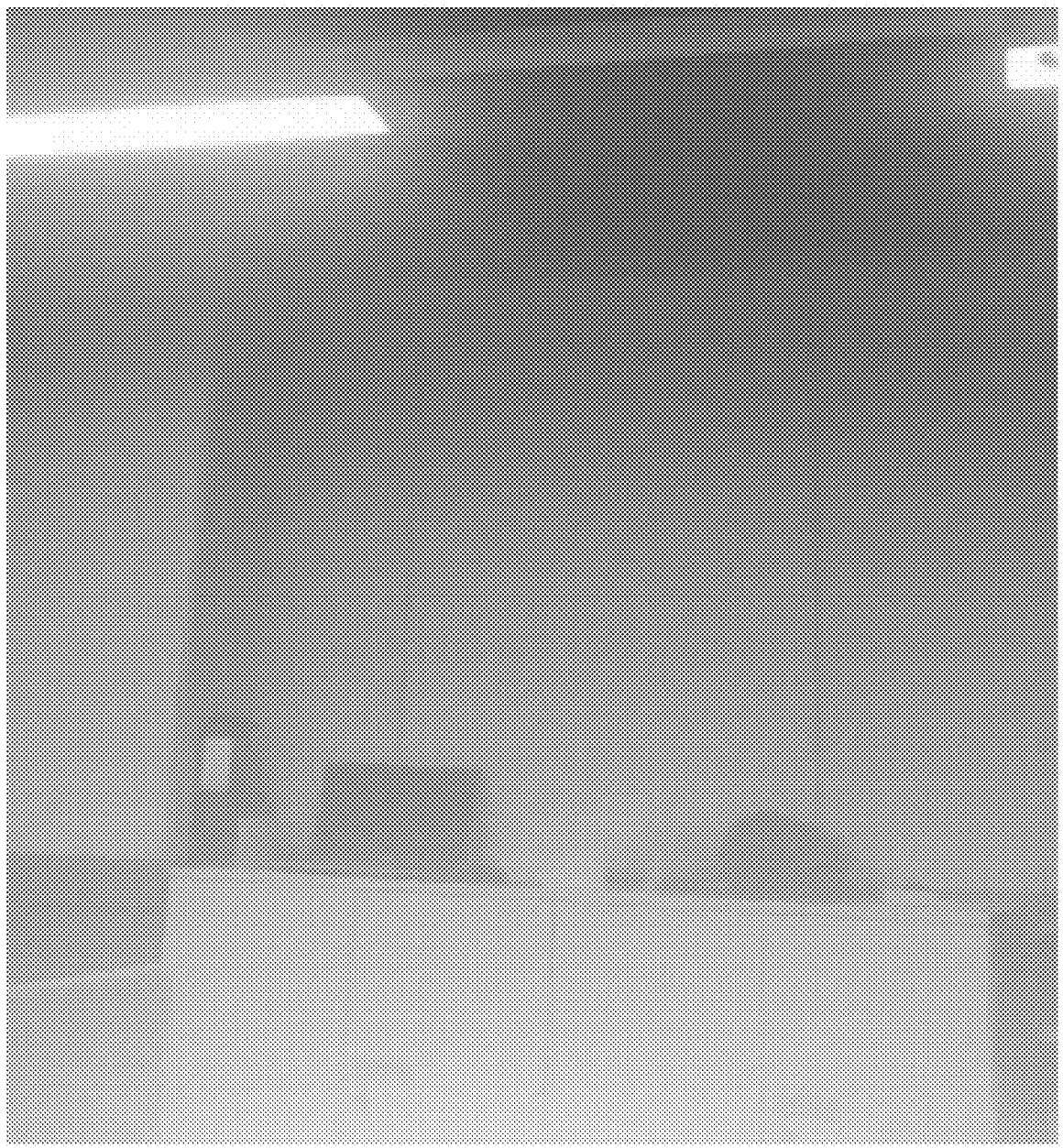
FIG. 30 is a picture of a periphery in a state in which a mobile phone case is mounted in a mobile phone when there is no configuration of an anti-reflection portion of the present disclosure according to Experimental Example 2.
Figure 31:
FIG. 31 is a picture of a periphery in a state in which a mobile phone case is mounted in a mobile phone when there is a configuration of an anti-reflective portion of the present disclosure according to Experimental Example 2.

When there is no configuration of the anti-reflection portion of the present disclosure, the mobile phone case was mounted in the mobile phone and the mobile phone took a picture of a periphery. FIG. 30 illustrates a picture of the photographed result. Further, the mobile phone case having a configuration of the anti-reflection portion was mounted in the mobile phone and the mobile phone took a picture of a periphery. FIG. 31 illustrates a picture of the photographed result.

In FIG. 30, there is no configuration of an anti-reflection portion and thus a light spread phenomenon occurs and it may be determined that a lower part is photographed bluish. In FIG. 31, it may be determined that a light spread phenomenon of FIG. 30 was remarkably improved by a configuration of an anti-reflection portion. By forming a recessed portion by a simple process such as simple CNC machining, a configuration of the anti-reflection portion of the present disclosure may be implemented and thus when photographing an image while simply detecting a hidden camera, a light spread phenomenon can be improved.

While the embodiments of the present disclosure have been described with reference to the accompanying drawings, the present disclosure is not limited to the above embodiments, but may be manufactured in various forms, and it will be understood by those skilled in the art that the present disclosure may be embodied in other specific forms without changing the technical spirit or essential features of the present disclosure. Therefore, it should be understood that the embodiments described above are exemplary in all respects and not restrictive.

According to embodiments of the present disclosure, the present disclosure has at least following effects.

According to the present disclosure, a mobile phone case can be easily carried at a low price and conveniently detect a hidden camera.

Further, according to the present disclosure, the mobile phone case performs a hidden camera detection function using a modified position of some components only when detecting a hidden camera without using normally, thereby performing a hidden camera detection function while increasing portability.

Further, according to the present disclosure, the mobile phone case is excellent in durability while performing the above functions to be used for a long time.

The effects according to the present disclosure are not limited by contents illustrated above, and more various effects are included in the present specification.

What is claimed is:

1. A mobile phone case, comprising:
    a case body whose one surface is formed to enclose portions, except for a display of a mobile phone and having an opening formed at a position corresponding to a light emitting diode (LED) light source and a camera of the mobile phone;
a detector comprising a red filter for passing through light of a red wavelength of a wavelength range of 600 nm to 700 nm; and
an operation unit whose one end is coupled to the detector and whose the other end is protruded to the other surface of the case body and for enabling the detector to move in a vertical or horizontal direction,
wherein the detector covers or opens the opening by the operating unit.

2. The mobile phone case of claim 1, wherein the detector further comprises a support coupled to one surface of the red filter and having a thickness of a range of 0.5 mm to 0.8 mm and made of a transparent material.

3. The mobile phone case of claim 1, wherein the red filter transmits more light of a red wavelength of a wavelength range of 600 nm to 700 nm among light emitted from the LED light source of the mobile phone.

4. The mobile phone case of claim 1, wherein the case body comprises one surface for covering a rear surface of the mobile phone display; an edge portion extended from the one surface and enclosing a periphery of the mobile phone display to be coupled to the mobile phone; an opening formed at a position corresponding to an LED light source and a camera of the mobile phone at the one surface and for covering both end surfaces of the LED light source and the camera; and a guide line opened to vertically or laterally move while a portion of the operation unit is protruded to the outside, and
wherein the detector moves in a vertical direction or a lateral direction to cover or not to cover the opening, when a part of the operation unit moves in a vertical direction or a lateral direction of the guide line.

5. The mobile phone case of claim 4, wherein the case body comprises a first receiving portion formed at one surface to which the mobile phone is coupled and for receiving at least a portion of the detector, and
wherein at least a portion of the detector is received with interposed between the first receiving portion and one surface of the case body.

6. The mobile phone case of claim 5, wherein the first receiving portion further comprises a first damage prevention portion opened in a horizontal plane direction in which one surface of the case body is formed at positions of both ends of a direction opposite to a direction in which the opening is formed.

7. The mobile phone case of claim 6, wherein the first damage prevention portion is opened in a direction perpendicular to a horizontal plane direction in which one surface of the case body is formed.

8. The mobile phone case of claim 7, wherein the first receiving portion further comprises a first support line extended from one end to the other end of an opening in which the first damage prevention portion is formed and contacting one surface of the case body,
wherein the first support line has a height lower than that of the first receiving portion in which the first damage preventing portion is not formed, and
wherein the detector is positioned above the first support line, when the detector is received in the first receiving portion.

9. The mobile phone case of claim 6, further comprising a first engraving portion recessed inward from one surface of the case body,
wherein the first engraving portion is overlapped with at least a portion of the detector on a vertical line when the detector is received in the first receiving portion.

10. The mobile phone case of claim 6, further comprising at least one first buffering portion protruded from one surface of the case body and formed with an elastic member,
wherein the first buffering portion contacts at least a portion of the detector when the detector is received in the first receiving portion.

11. The mobile phone case of claim 5, further comprising a cover coupled to a part of the operation unit and a part of the detector,
wherein the cover covers all of the guide lines, when the detector covers the opening.

12. The mobile phone case of claim 11, further comprising a stopper protruded from one surface of the case body,
wherein the stopper stops a movement of the detector by contact with the cover, when the detector is received in the first receiving portion.

13. The mobile phone case of claim 5, further comprising a cover coupled to a part of the operation unit and a part of the detector,
wherein the first receiving portion comprises a penetration portion that is opened to enable the cover to pass therethrough, and
wherein the cover covers all of the guide lines, when the detector covers the opening.

14. The mobile phone case of claim 4, wherein the case body comprises a second receiving portion formed at one surface to which the mobile phone is coupled and for receiving at least a portion of the detector,
wherein at least a portion of the detector is received with interposed between the second receiving portion and one surface of the case body, and
wherein at least a portion of the detector is received in the second receiving portion when the opening is covered.

15. The mobile phone case of claim 14, wherein the second receiving portion further comprises a second damage prevention portion opened in a horizontal direction in which one surface of the case body is formed at a position of both ends of a direction opposite to a direction in which the opening is formed.

16. The mobile phone case of claim 15, wherein the second damage prevention portion is opened in a direction perpendicular to a horizontal surface direction in which one surface of the case body is formed.

17. The mobile phone case of claim 16, wherein the second receiving portion further comprises a second support line extended from one end to the other end of an opening in which the second damage prevention portion is formed and contacting one surface of the case body,
wherein the second support line has a height lower than that of the second receiving portion in which the second damage prevention portion is not formed, and
wherein the detector is positioned above the second supporting line, when the detector is received in the second receiving portion.

18. The mobile phone case of claim 14, further comprising a second engraving portion recessed inward at one surface of the case body,
wherein the second engraving portion is overlapped with at least a portion of the detector on a vertical line, when the detector is received in the second receiving portion.

19. The mobile phone case of claim 14, further comprising at least one second buffering portion protruded from one surface of the case body and formed with an elastic member, wherein the second buffering portion contacts at least a portion of the detector, when the detector is received in the second receiving portion.

20. The mobile phone case of claim 1, wherein the detector further comprises a fastening portion for fastening the red filter and the support at both ends facing each other.

21. The mobile phone case of claim 1, wherein the detector further comprises an anti-reflection portion recessed inward at a position adjacent to the mobile phone, and wherein the anti-reflection portion is formed at a position corresponding to that of the LED light source of the mobile phone.

22. The mobile phone case of claim 21, wherein the anti-reflection portion covers all horizontal cross-sections of the LED light source on a vertical line.

23. The mobile phone case of claim 22, wherein the anti-reflection portion does not overlap a horizontal cross-section on a vertical line with the camera of the mobile phone.

24. The mobile phone case of claim 21, wherein the anti-reflection portion further comprises a light absorber made of a material absorbing light in the recessed inner wall.

* * * * *